United States Patent
Palumbo et al.

(10) Patent No.: US 8,438,108 B1
(45) Date of Patent: *May 7, 2013

(54) SYSTEM AND METHOD FOR TRANSFERRING MORTGAGE LOAN SERVICING RIGHTS

(75) Inventors: Donald R. Palumbo, Ashburn, VA (US); Thomas J. Carter, Walkersville, MD (US); Amelia M. Dixon, Clifton, VA (US); Kathleen P. Keller, Ashburn, VA (US); John J. Jozwiak, Frederick, MD (US)

(73) Assignee: Fannie Mae, Washington, DC (US)

( * ) Notice: Subject to any disclaimer, the term of this patent is extended or adjusted under 35 U.S.C. 154(b) by 36 days.

This patent is subject to a terminal disclaimer.

(21) Appl. No.: 12/825,155

(22) Filed: Jun. 28, 2010

Related U.S. Application Data

(62) Division of application No. 11/508,470, filed on Aug. 23, 2006, now Pat. No. 7,747,526.

(60) Provisional application No. 60/786,153, filed on Mar. 27, 2006.

(51) Int. Cl.
*G06Q 40/00* (2012.01)

(52) U.S. Cl.
USPC .......... 705/40; 705/38; 705/35; 705/37; 705/80; 705/316; 705/64; 705/51; 710/310

(58) Field of Classification Search .......... 705/26, 705/30–45, 80, 316, 64, 51; 710/310
See application file for complete search history.

(56) References Cited

U.S. PATENT DOCUMENTS

| | | | |
|---|---|---|---|
| 3,316,395 | A | 4/1967 | Lavin |
| 4,876,648 | A | 10/1989 | Lloyd |
| 5,239,462 | A | 8/1993 | Jones et al. |
| 5,262,941 | A | 11/1993 | Saladin et al. |
| 5,274,547 | A | 12/1993 | Zoffel et al. |
| 5,323,315 | A | 6/1994 | Highbloom |

(Continued)

FOREIGN PATENT DOCUMENTS

| | | |
|---|---|---|
| JP | 04-182868 | 6/1992 |
| JP | 2002-007701 | 1/2002 |

(Continued)

OTHER PUBLICATIONS

Breakthroughs in Mortgage Banking: Looking Toward the Future, Real Estate Finance Press, Mortgage Bankers Association of America, 1996, pp. 5-1-5-8, ISBN 1-57599-016-4, Jess Lederman, Editor.

(Continued)

*Primary Examiner* — Tien Nguyen
(74) *Attorney, Agent, or Firm* — Foley & Lardner LLP

(57) ABSTRACT

A method for facilitating the sale of a loan having a loan asset and a service asset is provided. The method includes the steps of receiving a bid from one or more servicers for purchasing the servicing asset and receiving a loan commitment selection from a lender. The method further includes selecting a servicer from the one or more servicers with a lender based upon a predefined set of criteria for selecting a servicer. The method also includes generating an all-in price, the all-in price including the price for purchasing the loan asset and the servicing.

10 Claims, 19 Drawing Sheets

U.S. PATENT DOCUMENTS

| | | | |
|---|---|---|---|
| 5,361,201 A | 11/1994 | Jost et al. |
| 5,414,621 A | 5/1995 | Hough |
| 5,537,315 A | 7/1996 | Mitcham |
| 5,563,783 A | 10/1996 | Stolfo et al. |
| 5,611,052 A | 3/1997 | Dykstra et al. |
| 5,615,268 A | 3/1997 | Bisbee et al. |
| 5,689,649 A | 11/1997 | Altman et al. |
| 5,696,907 A | 12/1997 | Tom |
| 5,699,527 A | 12/1997 | Davidson |
| 5,732,400 A | 3/1998 | Mandler et al. |
| 5,765,144 A | 6/1998 | Larche et al. |
| 5,797,133 A | 8/1998 | Jones et al. |
| 5,870,721 A | 2/1999 | Norris |
| 5,878,403 A | 3/1999 | DeFrancesco et al. |
| 5,878,404 A | 3/1999 | Stout et al. |
| 5,930,775 A | 7/1999 | McCauley et al. |
| 5,930,776 A | 7/1999 | Dykstra et al. |
| 5,940,811 A | 8/1999 | Norris |
| 5,940,812 A | 8/1999 | Tengel et al. |
| 5,966,699 A | 10/1999 | Zandi |
| 5,966,700 A | 10/1999 | Gould et al. |
| 5,970,464 A | 10/1999 | Apte et al. |
| 5,974,372 A | 10/1999 | Barnes et al. |
| 5,983,206 A | 11/1999 | Oppenheimer |
| 5,995,947 A | 11/1999 | Fraser et al. |
| 6,014,645 A | 1/2000 | Cunningham |
| 6,021,202 A | 2/2000 | Anderson et al. |
| 6,029,149 A | 2/2000 | Dykstra et al. |
| 6,035,288 A | 3/2000 | Solomon |
| 6,044,362 A | 3/2000 | Neely |
| 6,070,151 A | 5/2000 | Frankel |
| 6,076,070 A | 6/2000 | Stack |
| 6,088,686 A | 7/2000 | Walker et al. |
| 6,105,007 A | 8/2000 | Norris |
| 6,112,190 A | 8/2000 | Fletcher et al. |
| 6,119,103 A | 9/2000 | Basch et al. |
| 6,125,349 A | 9/2000 | Maher |
| 6,144,948 A | 11/2000 | Walker et al. |
| 6,202,053 B1 | 3/2001 | Christiansen et al. |
| 6,226,624 B1 | 5/2001 | Watson et al. |
| 6,233,566 B1 | 5/2001 | Levine et al. |
| 6,289,319 B1 | 9/2001 | Lockwood |
| 6,311,169 B2 | 10/2001 | Duhon |
| 6,324,526 B1 | 11/2001 | D'Agostino |
| 6,367,013 B1 | 4/2002 | Bisbee et al. |
| 6,385,594 B1 | 5/2002 | Lebda et al. |
| 6,401,070 B1 | 6/2002 | McManus et al. |
| 6,405,181 B2 | 6/2002 | Lent et al. |
| 6,430,539 B1 | 8/2002 | Lazarus et al. |
| 6,438,526 B1 | 8/2002 | Dykes et al. |
| 6,505,176 B2 | 1/2003 | DeFrancesco, Jr. et al. |
| 6,513,018 B1 | 1/2003 | Culhane |
| 6,532,450 B1 | 3/2003 | Brown et al. |
| 6,584,467 B1 | 6/2003 | Haught et al. |
| 6,594,635 B1 | 7/2003 | Erlanger |
| 6,609,109 B1 | 8/2003 | Bradley et al. |
| 6,611,816 B2 | 8/2003 | Lebda et al. |
| 6,651,884 B2 | 11/2003 | Prendergast et al. |
| 6,671,673 B1 | 12/2003 | Baseman et al. |
| 6,823,319 B1 | 11/2004 | Lynch et al. |
| 7,146,337 B1 | 12/2006 | Ward et al. |
| 7,512,559 B1 * | 3/2009 | Snyder et al. ............. 705/37 |
| 2001/0029482 A1 | 10/2001 | Tealdi et al. |
| 2001/0032178 A1 | 10/2001 | Adams et al. |
| 2001/0037287 A1 | 11/2001 | Broadbent et al. |
| 2002/0029154 A1 | 3/2002 | Majoor |
| 2002/0029194 A1 | 3/2002 | Lewis et al. |
| 2002/0032635 A1 | 3/2002 | Harris et al. |
| 2002/0035520 A1 | 3/2002 | Weiss |
| 2002/0038318 A1 | 3/2002 | Cochran et al. |
| 2002/0040339 A1 | 4/2002 | Dhar et al. |
| 2002/0052815 A1 | 5/2002 | Johnson et al. |
| 2002/0052835 A1 | 5/2002 | Toscano |
| 2002/0059137 A1 | 5/2002 | Freeman et al. |
| 2002/0077968 A1 | 6/2002 | Kaniwa et al. |
| 2002/0087364 A1 | 7/2002 | Lerner et al. |
| 2002/0087389 A1 | 7/2002 | Sklarz et al. |
| 2002/0091550 A1 | 7/2002 | White et al. |
| 2002/0091630 A1 | 7/2002 | Inoue |
| 2002/0099650 A1 | 7/2002 | Cole |
| 2002/0111835 A1 | 8/2002 | Hele et al. |
| 2002/0111901 A1 | 8/2002 | Whitney |
| 2002/0138414 A1 | 9/2002 | Baker |
| 2002/0152155 A1 | 10/2002 | Greenwood et al. |
| 2002/0152165 A1 | 10/2002 | Dutta et al. |
| 2002/0152170 A1 | 10/2002 | Dutta et al. |
| 2003/0018558 A1 * | 1/2003 | Heffner et al. ............. 705/37 |
| 2003/0023610 A1 | 1/2003 | Bove et al. |
| 2003/0028478 A1 | 2/2003 | Kinney et al. |
| 2003/0033241 A1 | 2/2003 | Harari |
| 2003/0033242 A1 | 2/2003 | Lynch et al. |
| 2003/0036994 A1 | 2/2003 | Witzig et al. |
| 2003/0036995 A1 | 2/2003 | Lazerson |
| 2003/0036996 A1 | 2/2003 | Lazerson |
| 2003/0046223 A1 | 3/2003 | Crawford et al. |
| 2003/0065614 A1 | 4/2003 | Sweeney |
| 2003/0093366 A1 | 5/2003 | Halper et al. |
| 2003/0110249 A1 | 6/2003 | Buus et al. |
| 2003/0167191 A1 | 9/2003 | Slabonik et al. |
| 2003/0172025 A1 | 9/2003 | Gallina |
| 2003/0177032 A1 | 9/2003 | Bonissone et al. |
| 2003/0182159 A1 | 9/2003 | Bonissone et al. |
| 2003/0187696 A1 | 10/2003 | Bonissone et al. |
| 2003/0187697 A1 | 10/2003 | Bonissone et al. |
| 2003/0187698 A1 | 10/2003 | Bonissone et al. |
| 2003/0187699 A1 | 10/2003 | Bonissone et al. |
| 2003/0187700 A1 | 10/2003 | Bonissone et al. |
| 2003/0187701 A1 | 10/2003 | Bonissone et al. |
| 2003/0187702 A1 | 10/2003 | Bonissone et al. |
| 2003/0208385 A1 | 11/2003 | Zander et al. |
| 2003/0212654 A1 | 11/2003 | Harper et al. |
| 2003/0217034 A1 | 11/2003 | Shutt |
| 2003/0220879 A1 | 11/2003 | Gaughan et al. |
| 2003/0225662 A1 | 12/2003 | Horan et al. |
| 2003/0229553 A1 | 12/2003 | Kongyingyong et al. |
| 2003/0229581 A1 | 12/2003 | Green et al. |
| 2003/0233260 A1 | 12/2003 | Snell et al. |
| 2003/0233316 A1 | 12/2003 | Hu et al. |
| 2004/0002915 A1 | 1/2004 | McDonald |
| 2004/0019517 A1 | 1/2004 | Sennott |
| 2004/0030616 A1 | 2/2004 | Florance et al. |
| 2004/0030649 A1 | 2/2004 | Nelson et al. |
| 2004/0034592 A1 | 2/2004 | Hu et al. |
| 2004/0044620 A1 * | 3/2004 | Iversen ............. 705/40 |
| 2004/0049439 A1 | 3/2004 | Johnston et al. |
| 2004/0049445 A1 | 3/2004 | Kishore |
| 2004/0059653 A1 | 3/2004 | Verkuylen et al. |
| 2004/0064402 A1 | 4/2004 | Dreyer et al. |
| 2004/0107161 A1 | 6/2004 | Tanaka et al. |
| 2004/0122717 A1 | 6/2004 | Hancock |
| 2004/0128228 A1 * | 7/2004 | Whipple et al. ............. 705/38 |
| 2004/0215553 A1 * | 10/2004 | Gang et al. ............. 705/38 |
| 2005/0203839 A1 | 9/2005 | Dowell et al. |
| 2006/0004651 A1 | 1/2006 | Corr et al. |

FOREIGN PATENT DOCUMENTS

| | | |
|---|---|---|
| JP | 2002-259696 | 9/2002 |
| JP | 2002-288426 | 10/2002 |
| JP | 2003-223559 | 8/2003 |
| WO | WO-99/48036 | 9/1999 |
| WO | WO-00/62209 | 10/2000 |
| WO | WO-00/75833 | 12/2000 |
| WO | WO-01/16845 A1 | 3/2001 |
| WO | WO-01/18718 | 3/2001 |
| WO | WO-01/27832 | 4/2001 |
| WO | WO-01/33461 | 5/2001 |
| WO | WO-01/39079 | 5/2001 |
| WO | WO-01/50318 | 7/2001 |
| WO | WO-01/63445 A2 | 8/2001 |
| WO | WO-01/63446 | 8/2001 |
| WO | WO-01/63534 A2 | 8/2001 |
| WO | WO-01/80123 | 10/2001 |
| WO | WO-01/98999 | 12/2001 |
| WO | WO-02/06989 | 1/2002 |
| WO | WO-02/08855 | 1/2002 |
| WO | WO-02/23443 A1 | 3/2002 |
| WO | WO-02/084925 | 10/2002 |

| | | |
|---|---|---|
| WO | WO-02/093286 | 11/2002 |
| WO | WO-03/009152 | 1/2003 |
| WO | WO-03/071380 | 8/2003 |
| WO | WO-03/071388 | 8/2003 |

OTHER PUBLICATIONS

EDOCS, "edocs Teams with Fannie Mae to Offer Lenders Online Account Management Solution," Press Release, Mar. 12, 2001, edocs, Inc., USA, 2 pages.

Fannie Mae, "Secondary Marketing: Cash", 1997, Fannie Mae, USA, 81 pages.

Fannie Mae, "Delivering Loans for MBS", 1996, Fannie Mae, Washington, DC, USA, 137 pages.

Fannie Mae, "Fannie Mae and First American Financial to Provide Lenders with Electronic Access to More Products on MORNETPlus Network; Appraisals, Flood Certificates, and Title Insurance in Offering," Press Release, Dec. 21, 1999, Fannie Mae, Washington, DC, USA, 2 pages.

Fannie Mae, "Fannie Mae Unveils MORNETPlus on the Web; Lenders Can Now Access Automated Underwriting and Other Mortgage Transaction Services on Fanniemae.com," Press Release, Mar. 23, 2000, Fannie Mae, Washington, DC, USA, 2 pages.

Fannie Mae, "General Servicing Fundamentals", 1996, Fannie Mae, Washington, DC, USA, 174 pages.

Fannie Mae, "Guide to Underwriting with Desktop Underwriter", Oct. 1997, Verison 4.0, Fannie Mae, Washington, DC, USA, 152 pages.

Fannie Mae, "Guide to Underwriting with Desktop Underwriter®", Sep. 2002, 63 pages.

Fannie Mae, "Investor Accounting: Cash", 1996, Fannie Mae, Washington, DC, USA, 132 pages.

Fannie Mae, "Making Good Delivery a Guide to Delivering Loans for Cash and MBS", 1994, Fannie Mae, Washington, DC, USA, 121 pages.

Fannie Mae, "MORNET Cash Delivery System User's Guide", Nov. 1997, Version 2.6, Fannie Mae, Washington, DC, USA, 177 pages.

Fannie Mae, "MORNET MBS Pool Submission System User 19s Guide", Sep. 1998, Version 5.3, Fannie Mae, Washington, DC, USA, 256 pages.

Fannie Mae, "MORNET Servicing Support System User's Guide", Dec. 1998, Fannie Mae, Washington, DC, USA, 370 pages.

Fannie Mae, "Selling", 1995-2002 et al., Fannie Mae, Washington, DC, USA., 1119 pages.

Fannie Mae, "Servicing Guide", 1995-2002 et al., Forward, Table of Contents, Sections III, IX, X, and XI, Fannie Mae, Washington, DC, USA, 318 pages.

Final Office Action for U.S. Appl. No. 11/508,470, mailed Sep. 21, 2009, 18 pages.

Freddie Mac, Publication No. 557, Single Family Selling System, "Sell Loans to Freddie Mac for Cash, Servicing Released Sales Process," Oct. 2004, 2 pages.

Laser Overview, May 1993, chapters 1-18.

Non-Final Office Action for U.S. Appl. No. 11/508,470, mailed Sep. 2, 2009. Withdrawn by Examiner in U.S. Office Action for U.S. Appl. No. 11/508,470, mailed Sep. 21, 2009.

Notice of Allowance for U.S. Appl. No. 11/508,470, mail date Feb. 22, 2010, 7 pages.

Object Management Group, "Fannie Mae", CORBA Banking/Finance, Sep. 17, 2001, Object Management Group, Needham, MA, USA, 2 pages.

Raines Franklin D., "Speech by Franklin D. Raines Chairman and CEO of Fannie Mae, Fannie Mae and the Mortgage Industry in the E-Commerce Age," May 8, 2000, Fannie Mae, USA, 30 pgs.

Smith Tom "Fannie Mae Ramps up Web Apps: Q&A with Julie St. John Executive Vice President and Chief Technology Office and Michael Williams President of Fannie Mae e-Business" Internetweek.com, USA, Undated, 11 pgs.

Smith Tom, "E-Commerce Holds Keys to Home Ownership: Fannie Mae drives hug volumes of mortgage business to its e-marketplace," Internetweek.com, USA, Undated, 5 pgs.

Sun, "Success on Sun: Software Development Case Study Federal National Mortgage Association (Fannie Mae)," Mar. 1995, Sun, USA, 10 pages.

Williams Michael, "Technology and Other Keys to the Boom in Refinancing," American Banker, Apr. 20, 2003, vol. 168, Issue 63, p. 8., American Banker USA, 3 pages.

* cited by examiner

| AU Casefile | Lender Loan Number | Borrower Last Name | Actual Closing | Note Rate | Amount | Commitment Expiration Date | Gross SRP | Total Fees ($) | Escrow ($) | Net Funding SRP ($) |
|---|---|---|---|---|---|---|---|---|---|---|
| Non-EA | | | | | | | | | | |
| Lender A | | | | | | | | | | |
| 55667788 | SMITH | Smith | 6/1/2005 | 6.125% | $100,000.00 | 6/15/2005 | 1.558% | $166.00 | $747.00 | $2,561.20 |
| 33445566 | BURNS | Burns | 6/3/2005 | 6.000% | $123,000.00 | 6/7/2005 | 1.580% | $76.00 | $347.00 | $1,157.00 |
| | | | | | | | 1.540% | $90.00 | $400.00 | $1,404.20 |
| EA I | | | | | | $622,000.00 | 4.006% | $743.00 | $1,016.85 | $3,707.13 |
| Lender B | | | | | | | | | | |
| 11223344 | 98765 | Levin | 6/3/2005 | 6.250% | $300,000.00 | 6/10/2005 | 1.006% | $324.00 | $540.85 | $2,153.15 |
| 22334455 | 67654 | Irwin | 6/3/2005 | 6.000% | $322,000.00 | 6/16/2005 | 1.009% | $419.00 | $1,276.00 | $1,553.98 |
| EA III | | | | | | $301,000.00 | 0.925% | $202.00 | $540.85 | $2,041.63 |
| Lender E | | | | | | | | | | |
| 76567763 | 12666446763 | Purchaser | 6/10/2005 | 5.875% | $125,000.00 | 6/15/2005 | 0.528% | $79.00 | $540.85 | $540.15 |
| 87454565 | 12577637776 | Firsttimer | 6/5/2005 | 6.500% | $176,000.00 | 6/10/2005 | 0.923% | $123.00 | | $1,501.48 |
| Total for 30 Year Fixed | | | | 6.04% | $1,146,000.00 | | 1.093% | $1,111.00 | $3,104.70 | $8,309.96 |

Servicing Execution Tool

Closed/Delivered Commitments — Lender A

Home | Legal | Contact Us     Logout

Return to Closed/Delivered Commitments Summary                                    Export The closed commitments for this lender are summarized on this page by product and EA Level. To see more information about any of the loans listed on this page, click the loan number. To export information, in a comma-delimited (.csv) file format, about the loans displayed on this page, click the Export button. To view a summary of Closed/Delivered Commitments, click the link above or at the bottom of the page.

Pipeline Summary
Search Commitments
All Active Commitments
Closed/Delivered Commitments
Funded Commitments
SRP Schedule

| | | | | | | | | Commitment | | | Servicing | | |
|---|---|---|---|---|---|---|---|---|---|---|---|---|---|
| AUCasefile | Lender Loan Number | Borrower Last Name | Actual Closing | Note Rate | Amount | Expiration Date | Gross SRP | Total Fees ($) | Escrow ($) | Net Funding SRP ($) |

30 Year Fixed

Non-EA

| 55557788 | SMITH | Smith | 6/1/2005 | 6.125% | $100,000.00 | 6/15/2005 | 1.580% | $76.00 | $347.00 | $1,157.00 |
| 33445566 | BURNS | Burns | 6/3/2005 | 6.000% | $123,000.00 | 6/7/2005 | 1.540% | $90.00 | $400.00 | $1,404.20 |

Product Total for Lender A
| | | | | | $223,000.00 | | 1.558% | $166.00 | $747.00 | $2,561.20 |

Return to Closed/Delivered Commitments Summary                                Back to Top 602 → (points to 55557788)

Servicing Execution Tool

Pipeline Summary
Search Commitments
All Active Commitments
Closed/Delivered Commitments
Funded Commitments
SRP Schedule Home | Contact Us | Logout

Funded Commitments

The commitments displayed on this page, organized by date and lender, are for loans that have a funding date associated with them. To see more information about any of the commitments listed on this page, click the date or lender name. This page by default displays commitments from the last seven days. To display another date range, up to 60 days in the past, specify the range below and click the Search Date Range button.

To export information about all funded commitments in a comma-delimited (.csv) file format, click the Export button.

This page by default displays up to 50 commitments by date or by lender. If you want to display all the commitments by date or by lender that are funded, click the appropriate View All link, below.

Search Funded Commitments

From: 10/12/2005   To: 10/18/2005   [Search Date Range]

| Date | Count | Amount ($) | Wtd Avg Note Rate | Wtd Avg Gross SRP | Net Funding SRP ($) |
|---|---|---|---|---|---|
| Tuesday, Oct 18, 2005 | 9 | $2,041,887.00 | 5.722% | 1.342% | $10,562.24 |
| Monday, Oct 17, 2005 | 4 | $802,982.00 | 6.209% | 1.237% | $4,978.76 |
| Sunday, Oct 16, 2005 | 0 | $0.00 | 0.000% | 0.000% | $0.00 |
| Saturday, Oct 15, 2005 | 0 | $0.00 | 0.000% | 0.000% | $0.00 |
| Friday, Oct 14, 2005 | 8 | $1,629,030.00 | 6.203% | 1.259% | $14,766.87 |
| Thursday, Oct 13, 2005 | 2 | $1,577,546.00 | 6.250% | 0.988% | $1,497.22 |
| Wednesday, Oct 12, 2005 | 8 | $216,000.00 | 5.969% | 1.098% | $11,409.81 |
| Total for all Products | 31 | $6,306,395.00 | 6.066% | 1.245% | $43,214.90 |

| Lenders | Count | Amount ($) | Wtd Avg Note Rate | Wtd Avg Gross SRP | Net Funding SRP ($) |
|---|---|---|---|---|---|
| Lender A | 6 | $1,232,763.00 | 6.074% | 1.247% | $9,758.20 |
| Lender B | 7 | $1,442,763.00 | 6.112% | 1.111% | $9,622.75 |
| Lender C | 6 | $1,505,418.00 | 6.054% | 1.243% | $10,434.86 |
| Lender D | 6 | $811,437.00 | 6.100% | 1.123% | $4,789.31 |
| Lender E | 6 | $1,314,022.00 | 6.095% | 1.140% | $8,609.78 |
| Total for all Lenders | 31 | $6,306,395.00 | 6.087% | 1.245% | $43,214.90 |

Servicing Execution Tool

Servicing Commitment Detail

Printed on 5/22/2005

| | |
|---|---|
| Servicer | Servicer A |
| Servicer Number | 123456789 |
| Servicer Loan Number | |
| SRP Schedule Date | 6/17/2005 |
| SET Pricing Date | 6/21/2005 |

| | |
|---|---|
| Lender Name | Lender A |
| Lender ID | 124840029 |
| Lender Loan Number | 12566546763 |

| | |
|---|---|
| AU Casefile ID | 76567763 |
| Product Name | 30 Year Fixed |
| EA Level | EA I |
| First Lien Note Rate | 6.125% |
| Subject Property Number of Units | 1 |
| Borrower Last Name | Smith |
| Property Address (city, state, zip) | 101 South Main Street, Anywhere USA 12345 |

Current Commitment

| Loan Status | Closing Date | Delivery Status | Funding Date | Loan Amount | Effective Date | Expiration Date |
|---|---|---|---|---|---|---|
| Closed | 6/21/2005 | Data Delivered | | $250,000.00 | 5/15/2005 | 6/30/2005 |

| Discount/Premium Range (low to high) | 0.0000 | 0.0000 |
|---|---|---|

SRP Total Fees

| | |
|---|---|
| Flood Certification | $10.00 |
| Lender Processing Fee | $125.00 |
| Total Fees | $135.00 |

| | Points | Dollars |
|---|---|---|
| Gross SRP | 1.0340 | $2,585.00 |
| − SRP Total Fees | 0.0540 | $135.00 |
| − Total Escrows | 0.2947 | $736.70 |
| = SRP Net Funding | 0.6853 | $1,713.30 |

682 →

© Fannie Mae. All Rights Reserved.

SYSTEM AND METHOD FOR TRANSFERRING MORTGAGE LOAN SERVICING RIGHTS

CROSS-REFERENCE TO RELATED APPLICATIONS

This application is a divisional of U.S. patent application Ser. No. 11/508,470, filed Aug. 23, 2006, entitled "System and Method for Transferring Mortgage Loan Servicing Rights," which claims the benefit under 35 USC 119(e) of U.S. Prov. Pat. App. 60/786,153, filed Mar. 27, 2006, entitled "Mortgage Loan Commitment System and Method," both of which are incorporated herein by reference in their entirety.

BACKGROUND

Typically, when a potential borrower plans to take out a loan, for example, in purchasing a home, the borrower may consult lenders such as banks, credit unions, mortgage companies, government housing agencies, etc., in order to obtain the funds necessary to purchase the home. These lenders typically offer a series of loan products to potential borrowers. In making a loan, the lender is committing to provide funds to the borrower based on the borrower's qualifications. In exchange for the loan, the borrower is committing to repay the loan funds by way of a series of loan payments. The lenders make loans to borrowers in the "primary mortgage market."

Often, after making loans to borrowers in the primary mortgage market, lenders sell the loans to investors in the "secondary mortgage market." Each loan may be sold alone, or in packages with other loans, for cash or in exchange for securities which provide lenders with a liquid asset to hold or sell to the secondary market. By selling its loans in the secondary mortgage market, a lender replenishes its supply of available funds, thereby providing it with more funds to make more loans to other borrowers.

Mortgage loans are typically viewed as comprising two separate components or assets: a loan asset and a servicing asset. The loan asset provides the secondary mortgage market investor with an interest in the loan payments, including principal and interest payments, made by the borrower pursuant to the loan. Thus, the investor receives a return on its investment by receiving the principal and interest payments made by the borrower.

The servicing asset also provides an interest in the payment stream associated with the loan. The servicing asset is typically owned by an entity, referred to as a servicer, that receives loan payments from the borrower and/or performs other servicing functions in connection with the loan. Typically, when the servicer receives the loan payments, the servicer retains a portion of the interest payment as a fee for servicing the loan. The servicing asset thus provides the servicer with the right to receive an income stream for servicing the loan.

When a loan is sold, the transaction is typically structured in one of several ways. According to one type of transaction, referred to as a whole loan sale or a servicing-released execution, the lender sells the entire loan (including both the loan asset and the servicing asset) to one entity. For example, the lender may sell the loan and servicing assets to an aggregator or wholesaler, which may turn around and sell the loan assets to investors in the capital markets and sell the servicing assets to servicers.

In another type of transaction, referred to as a co-issue sale or a servicing-retained execution, the lender sells the loan asset and retains the servicing asset. A lender that selects a servicing retained execution may decide to perform servicing of the loan itself or may decide to aggregate the servicing assets and sell the servicing assets in bulk to a servicer. Some lenders may wish to perform servicing internally because they can do so on a scale that is cost-effective. Some lenders may also decide to perform servicing internally in order to maintain a direct relationship with the borrower. Other lenders may decide to aggregate the servicing assets and sell the servicing assets in bulk to a servicer. Such lenders may consider it desirable to sell the servicing asset in order to avoid the need to support and manage the servicing assets. For example, in addition to receiving payments from borrowers, the lender must manage the volatility of the servicing asset and properly account for the servicing asset in its financial reporting.

A co-issue sale is operationally efficient because the loan asset is delivered directly to an investor and the servicing asset is delivered directly to a servicer. However, difficulty has been encountered because there is still a need for the lender to support and manage servicing assets during the time period in which servicing assets are being aggregated, i.e., after the loans have been made but before the servicing assets are sold in bulk to a servicer. Particularly for small to mid-size lenders, such as community-based lenders, the resources needed to support and manage servicing assets during this time period may drastically reduce the efficiencies that may otherwise be obtained through a co-issue sale.

Accordingly, there is a need for improved systems and methods that may be used to facilitate the sale of loans into the secondary mortgage market. There is also a need for systems and methods that may be used to facilitate the sale of loans into the secondary mortgage market using different types of transactions, including transactions involving the sale of servicing assets on a flow basis or in bulk. There is also a need for systems and methods that facilitate the sale of a loan into the secondary mortgage market, including the sale of servicing assets to one of multiple servicers, for example, through a brokered auction-like process. There is also a need for systems and methods that enable servicers to manage loan commitment pipelines comprising loans from multiple lenders through a network-based (e.g., Internet-based) user interface.

It would be desirable to provide systems and methods that provide one or more of these or other advantageous features as may be apparent to those reviewing this disclosure. The teachings disclosed extend to those embodiments which fall within the scope of the appended claims, regardless of whether they accomplish one or more of the above-mentioned needs.

SUMMARY

In accordance with one exemplary embodiment, a method for facilitating the sale of a loan, the loan having a loan asset and a service asset, comprises the steps of receiving a bid from one or more servicers for purchasing the servicing asset and receiving a loan commitment selection from a lender. The method further includes selecting a servicer from the one or more servicers with a lender based upon a predefined set of criteria for selecting a servicer. The method also includes generating an all-in price, the all-in price including the price for purchasing the loan asset and the servicing.

In accordance with another exemplary embodiment, a system for interfacing one or more lenders with one or more servicers to facilitate the sale of a loan from a lender to a servicer, the loan having a loan asset and a servicing asset, comprises means for receiving a loan commitment selection from the lender. The system further comprises means for receiving a bid to purchase the servicing asset of the loan submitted by one or more servicers. The means for receiving a bid is configured to match one of the one or more servicers to a lender based upon a predefined set of criteria for matching a servicer to a lender.

In accordance with yet another exemplary embodiment, a computer-implemented system for facilitating sale of a mortgage loan, the mortgage loan having a loan asset and a servicing asset, comprises committing logic configured to receive a loan commitment. The system further comprises servicing execution logic coupled to the committing logic and configured to receive servicing-released pricing from one or more servicers for purchasing the servicing asset of the loan from the lender. The servicing execution logic is further configured to select one of the one or more servicers as a purchaser for a servicing asset of the mortgage loan from the lender based upon parameters specified by the servicers and/ or by the lender. The parameters include the servicing released pricing received from the servicers, such that the servicing execution logic is configured to select one of the one or more servicers as the purchaser based on the servicing released pricing received from the servicers. The system further comprises user interface logic coupled to the servicing execution logic and configured to provide a user interface accessible to servicers by way of a communication network. The user interface logic is configured to provide pipeline management screen displays configured to provide a respective servicer with information concerning a servicing asset pipeline of the servicer. The pipeline management screen displays are configured to provide status information concerning loans in the servicing asset pipeline of the servicer. The status information includes an indication that at least some of the loans have an active status. The active status indicates that the loan has been committed but has not yet closed. The screen displays include a screen display that shows a plurality of loans having the active status from a plurality of different lenders. The status information includes an indication that at least some of the loans have a closed status. The closed status indicates that the respective loan has closed and delivered but has not yet been funded. The screen displays include a screen display that shows a plurality of loans having the closed status from a plurality of different lenders. The status information includes an indication that at least some of the loans have a funded status. The funded status indicates that the loan respective is closed and delivered and funds have been transmitted. The screen displays include a screen display that shows a plurality of loans having the funded status from a plurality of different lenders. The user interface logic is further configured to provide screen displays configured to permit a servicer to provide schedules containing the servicing-released pricing. The servicing released pricing schedules are configurable by lender, such that the servicer may offer different lenders different pricing for the same mortgage product.

Other features and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

FIG. 7 is a screen display showing search results that may be presented to a user responsive to the user performing a search in FIG. 6 according to an exemplary embodiment.

FIG. 8 is a screen display showing a pipeline summary for the servicer according to an exemplary embodiment.

FIG. 9 is a screen display showing active commitments for the servicer according to an exemplary embodiment.

FIG. 10 is a screen display showing active commitments by product type according to an exemplary embodiment.

FIG. 11 is a screen display showing active commitments for a specific lender according to an exemplary embodiment.

FIG. 13 is a screen display showing closed and delivered commitments by product type according to an exemplary embodiment.

FIG. 14 is a screen display showing closed and delivered commitments for a specific lender according to an exemplary embodiment.

FIG. 15 is a screen display showing funded commitments for the servicer according to an exemplary embodiment.

FIG. 16 is a screen display showing funded commitments for a specific day according to an exemplary embodiment.

FIG. 17 is a screen display showing funded commitments for a specific lender according to an exemplary embodiment.

FIG. 18 is a screen display showing commitment details for a specific loan according to an exemplary embodiment.

FIG. 19 is a screen display showing a servicing-released premium schedule according to an exemplary embodiment.

DETAILED DESCRIPTION OF THE PREFERRED EMBODIMENTS

I. Exemplary Transaction Execution System

Figure 1:
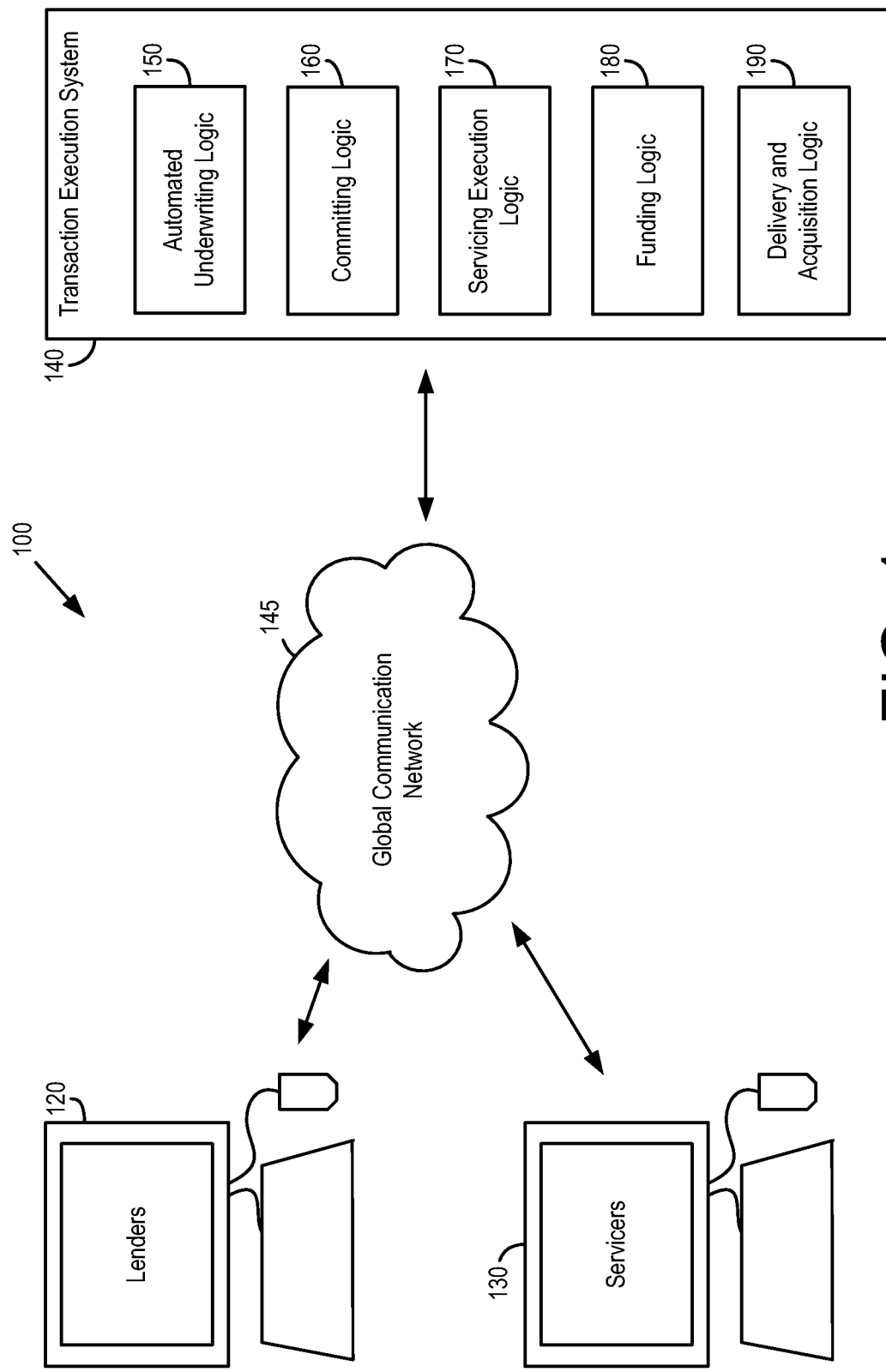
FIG. 1 is a block diagram of a loan transaction system according to an exemplary embodiment.

Referring to FIG. 1, an exemplary system 100 for buying and selling loan assets and servicing assets in the secondary mortgage market is shown. The system 100 includes a plurality of lender computers 120, a plurality of servicer computers 130, and a transaction execution system 140. The lender computers 120 are located or otherwise associated with different lenders using system 100 for selling loan and servicing assets in the secondary mortgage market. Likewise, the servicer computers 130 are located or otherwise associated with different servicers using system 100 for purchasing servicing rights of loans in the secondary mortgage market.

The lender computers 120 and the servicer computers 130 are connected to the execution system 140 by way of a communication network 145 (e.g., the Internet). Execution system 140 facilitates the sale of loan assets and servicing assets in the secondary mortgage market by providing a transaction system that brings together multiple entities that are interested in buying and selling loan assets and servicing assets.

In an exemplary embodiment, execution system 140 is operated by an entity that is active in the secondary mortgage market. For example, execution system 140 may be operated by a lender, an investor, a servicer, an aggregator, or another entity. For purposes of providing an example, it is assumed herein that execution system 140 is operated by an investor. Herein, the term "investor" refers to an entity that purchases loan assets from lenders, for example, to hold in its own portfolio, to package for sale to other investors, and so on.

In an exemplary embodiment, where execution system 140 is operated by an investor, execution system 140 may facilitate the sale of the loan assets to the investor and the servicing assets to one or more servicers. To this end, execution system 140 may provide network-accessible tools that may be accessed by lenders and servicers. For example, lenders may access automated underwriting engine 150 by way of network 145 to submit loans for automated underwriting in accordance with the underwriting guidelines of a secondary mortgage market purchaser (e.g., the investor). Additionally, lenders may access committing logic 160 by way of network 145 to enter into commitments with the investor and with the servicers. Servicers may access servicing execution logic 170 by way of network 145 to configure transaction settings and preferences and to monitor their transaction pipeline. For loans that close, lenders may access delivery logic 190 to deliver loans to the investor and to the servicers. Other or different tools and interfaces may also be provided.

The lender may sell the entire loan including both the servicing asset and the loan asset through the execution system 140. The loan asset may be sold to the investor and the servicing asset may be sold to one of the servicers. Ownership of the servicing asset may be transferred directly to the servicer (e.g., a co-issue execution), may be transferred to the servicer through the investor (e.g., a whole loan execution), or may be transferred to the servicer through another type of transaction. The investor may pay for the loan assets with cash (e.g., a cash execution), with mortgage backed securities (e.g., an MBS execution), or in another manner.

In an exemplary embodiment, execution system 140 may support best efforts commitments, mandatory commitments, and/or other types of commitments. A best efforts commitment is a forward commitment by a lender to use its best efforts to close a committed loan, and to deliver that commitment to the investor on or before a commitment expiration date. A best efforts commitment provides the lender with the ability to receive a pass-through commitment price on a specific mortgage for a specific borrower and property, without the need for a pair-off if the borrower withdraws the application, or if the loan falls out for underwriting reasons. If the loan is not delivered by the commitment expiration date, the best efforts commitment expires and the investor's obligation to honor the commitment price ends. From the perspective of the lender, loans may be sold on a one-by-one or flow basis, permitting loans to be sold as soon as the loans are closed. In such an arrangement, both the loan asset and the servicing asset may be sold on a flow basis, such that the lender altogether avoids the need to support and manage the servicing asset after the loan is closed. Committing logic 160 may also support mandatory commitments. A mandatory commitment is a forward commitment by a lender to deliver a specified dollar value of loans to the investor on or before a commitment expiration date.

Figure 2:
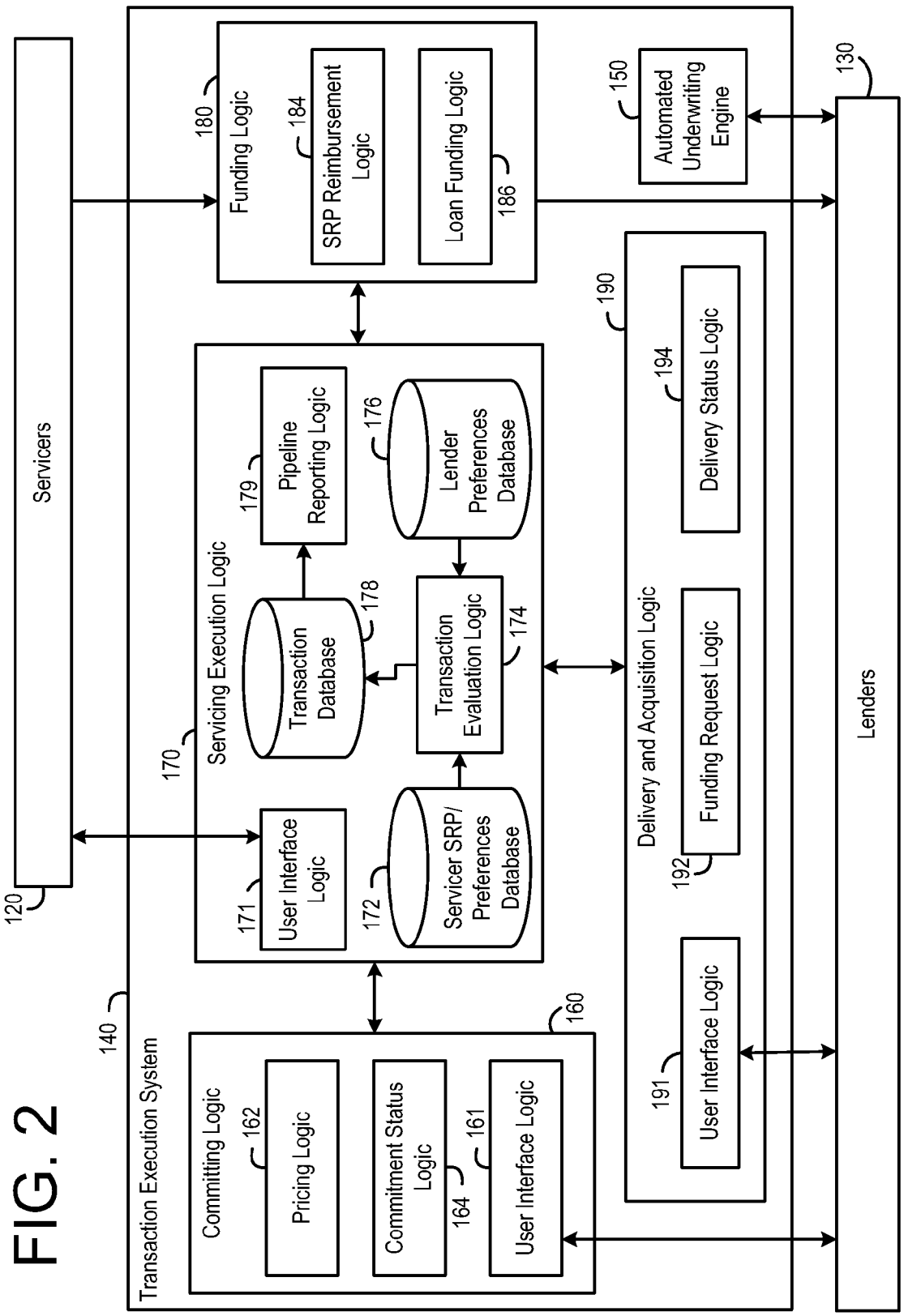
FIG. 2 is a block diagram of an execution system of FIG. 1 in greater detail according to an exemplary embodiment.

Referring now to FIG. 2, an exemplary embodiment of execution system 140 of FIG. 1 is shown in greater detail. As shown in FIG. 2, committing logic 160 may further include user interface logic 161, pricing logic 162 and commitment status logic 164. Servicing execution logic 170 may further include user interface logic 171, servicer SRP/preferences database 172, transaction matching logic 174, lender preferences database 176, servicing transaction database 178, and pipeline reporting logic 179. Funding logic 180 may further include SRP reimbursement logic 184 and loan funding logic 186. Lastly, delivery and acquisition logic 190 may further include user interface logic 191, funding request logic 192, and delivery status logic 194. The operation of the committing logic 160, servicing execution logic 170, funding logic 180, and delivery and acquisition logic 190 according to an exemplary embodiment is described in greater detail in connection with FIGS. 3-5, below.

Figure 3:
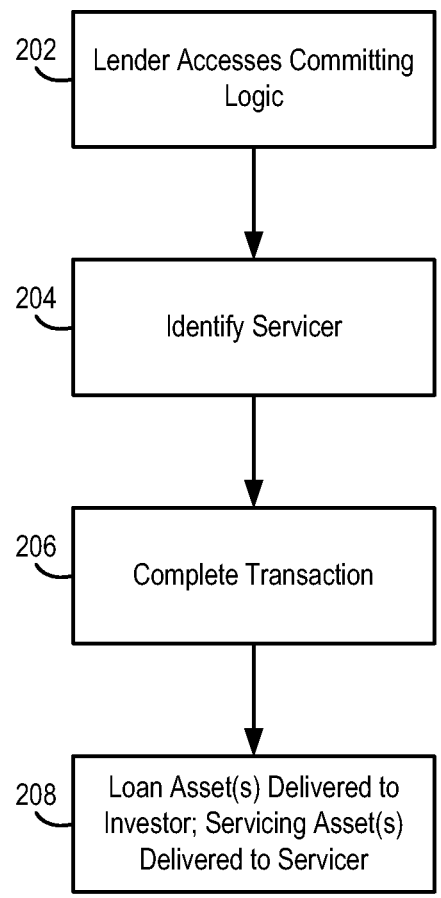
FIG. 3 is a flowchart showing operation of the loan transaction system of FIG. 1 according to an exemplary embodiment.

Referring now to FIG. 3, in an exemplary embodiment, at step 202, a lender accesses committing logic 160 using lender computer 120. The committing logic 160 is accessible to the lender by way of the communication network 145. In an exemplary embodiment, the lender may utilize the data processing system described in U.S. Ser. No. 10/736,400, entitled "Systems and Methods for Facilitating the Flow of Capital through the Housing Finance Industry," filed Dec. 15, 2003 ("the '400 application"), the disclosure of which is hereby incorporated by reference. In such an embodiment, the system described herein and the system described in the '400 application may be combined by implementing the commitment/selling/funding delivery/engine 124 described in the '400 application in accordance with the teachings herein regarding execution system 140. To the extent that best efforts commitments are used, as disclosed in the '400 application, such a combined system preferably uses the systems and methods described in pending U.S. Ser. No. 10/748,791, entitled "Method and System for Buying and Pricing Mortgage Loans Under Forward Commitments," filed Dec. 30, 2003, the entire disclosure of which is hereby incorporated by reference.

At step 204, a servicer is identified to purchase servicing rights for the loan. The servicer may be identified based on parameters provided by the servicer, based on parameters provided by the lender, and/or based on other parameters. In an exemplary embodiment, the servicers and/or the lenders are provided with the ability to provide information to servicing execution logic 170, and transaction evaluation logic 174 is configured to identify a servicer that is to purchase the servicing rights based on an evaluation of the information provided by the servicers and lenders in the context of a particular transaction.

For example, in an exemplary embodiment, a selected servicer may be identified based on pricing information provided by the servicers and stored in servicer SRP/preferences database 172. For example, each servicer may provide pricing schedules for servicing assets, and transaction evaluation logic 174 may implement an auction platform which identifies a servicer that is to purchase a servicing asset by selecting the servicer that provides the most favorable pricing for the servicing asset for the lender. In such an embodiment, execution system 140 provides participating lenders with competitive pricing for the sale of servicing assets through an auction-like bidding process among one or more servicers. In one embodiment, the servicer is selected automatically by the transaction evaluation logic 174, and the lender is only provided with the results of the selection (e.g., identity of the selected servicer, price to be paid by the selected servicer, and so on), and is not provided with information concerning other servicers (e.g., the identity of other servicers, the pricing offered by the other servicers, and so on). In another embodiment, the servicer is selected responsive to inputs received from the lender. For example, the pricing offered by multiple servicers may be provided to the lender, and the lender may provide inputs used to make the final selection of the servicer.

In an exemplary embodiment, the servicer may be provided with the option of specifying other parameters that impact operation of transaction evaluation logic 174. Such parameters may be stored in servicer SRP/preferences database 172. For example, a servicer may tailor its system profile in order to limit the lenders from which it purchases servicing assets. For example, a servicer may only submit SRP pricing schedules for those lenders from whom it wishes to purchase servicing assets. As another example, a servicer may submit different SRP pricing schedules for different lenders, such that different lenders receive different pricing for servicing assets. As another example, a servicer may tailor its system profile in order to limit the types of loan products for which it purchases servicing assets. For example, a servicer may submit SRP pricing schedules in which pricing is only provided for certain types of loans (e.g., SRP pricing schedules which provide pricing for fixed rate mortgages but not for adjustable rate mortgages). As another example, a servicer may also configure its profile in order to limit itself to a set number of transactions within a given time period. Other parameters may also be specified.

Likewise, the lender may also be provided with the option of specifying other parameters that impact operation of transaction evaluation logic 174. Such parameters may be stored in lender preferences database 176. For example, a lender may configure its system profile in order to limit the servicers to which it sells servicing assets, the types of loan products it sells to certain servicers, and so on. For example, a lender may only wish to sell servicing assets to certain specified servicers, and the lender may be provided with the ability to specify those servicers in database 176.

In an exemplary embodiment, in the context of a given transaction, the specified information may then be used by transaction evaluation logic 174 to identify a servicer to purchase servicing rights for the loan. For example, in the context of an auction platform, when a given lender commits to sell a loan, a determination may be made whether the lender has placed any constraints on the servicers to which it is willing to sell servicing assets, for example, for that particular loan product, for all loan products, and so on. Based on this information, an initial list of potential servicer-buyers may be determined (e.g., all servicers registered in system 100, or a subset thereof, depending on any constraints specified by the lender). Likewise, a determination may be made whether each of the servicers has placed any constraints on the lenders from which it is willing to purchase servicing assets, for example, for that particular loan product, for all loan products, and so on. On this basis, a list of potential servicer-buyers for the servicing asset may be identified, that is, a list of servicers for whom participation in the transaction is mutually agreeable to both the lender and to the respective servicer. The pricing offered by each potential servicer-buyer may then be determined and compared, and the servicing asset may be sold to the highest bidder.

As will be appreciated, transaction evaluation logic 174 may also provide participants with other options for selecting a servicer. For example, a lender may prefer a particular servicer, and may configure transaction evaluation logic 174 to always select the preferred servicer unless the pricing offered by a competitive servicer exceeds the pricing offered by the preferred servicer by a predetermined threshold. As another example, in another exemplary embodiment, a lender may be provided with the option of specifying multiple servicers and specifying transaction goals (e.g., in terms of dollar values, product types, numbers of loans, and so on) for each servicer. Thus, for example, rules logic may be implemented to monitor a lender's flow of business to servicers, e.g., to ensure fulfillment of any contracts in place with respective servicers, to implement a desired relative flow of business to a group of servicers, and so on.

At step 206, the transaction is completed. For example, the lender may execute the commitment, the loan transaction with the borrower may be closed, and so on. The order in which such steps are performed relative to each other and relative to other steps in FIG. 3 may depend on various parameters, including for example the nature of the commitment (best efforts vs. mandatory bulk commitment), and so on. At step 208, the loan asset is delivered to the investor and the servicing asset is delivered to the servicer.

Figure 4:
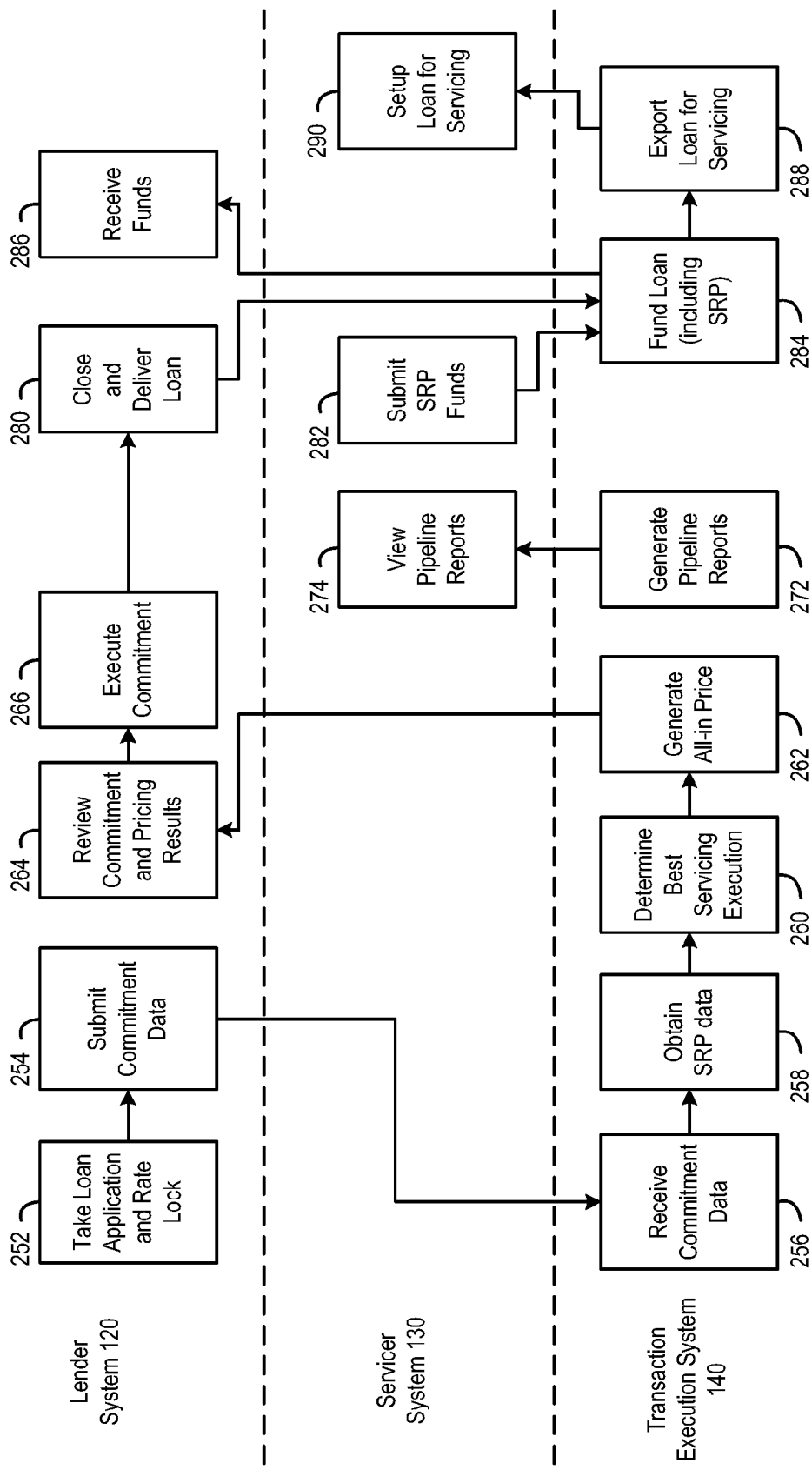
FIG. 4 is another flowchart showing operation of the loan transaction system of FIG. 1 according to an exemplary embodiment.

Referring now to FIG. 4, FIG. 4 provides a more detailed an example of the operation of execution system 140. In the example of FIG. 4, execution system 140 operates to facilitate the sale of a loan asset and a servicing asset in the context of a best efforts commitment.

At step 252, a lender initiates the process by accepting a loan application from a borrower. The lender processes the loan application and secures the terms of the loan. At step 254, the lender accesses user interface logic 161 of committing logic 160 via network 145 and submits loan commitment data to execution system 140. Steps 252 and 254 may, for example, be performed in accordance with the teachings of the above-mentioned '400 application.

In an exemplary embodiment, when the lender is accessing the committing logic 160 at the time of commitment, the lender is provided with the option of performing a servicing-retained best efforts commitment or a servicing-released best efforts commitment. If the lender elects to perform a servicing-retained best efforts commitment, then servicing execution logic 170 is not utilized and the transaction proceeds with only the commitment of the loan asset and not the servicing asset. On the other hand, if the lender elects to performing a servicing-released execution, then servicing execution logic 170 is utilized and the transaction proceeds with the commitment of both the loan asset and the servicing asset. By electing a servicing-released execution, the lender indicates that it wishes to be provided (at step 262, below) with an all-in commitment price for the loan that includes both an SRP pricing component for the servicing asset and a pass-through pricing component for the loan asset.

At step 256, the commitment data is received at execution system 140 from the lender. At step 258, the SRP data is obtained from the servicer SRP/preferences database 172. The SRP data is obtained for each servicer that the lender has indicated it is willing to sell servicing rights and that has indicated its willingness to purchase servicing rights from the lender. At step 260, an appropriate servicer is selected to purchase the servicing rights from the lender. Step 260 may, for example, be performed as described above in connection with step 204 of FIG. 3. At step 262, the pricing logic 162 generates an all-in price by combining the SRP pricing (servicing asset pricing) for the selected servicer with the pass-through pricing (loan asset pricing) for the investor. The pass-through pricing is the pricing offered by the investor and may be obtained from a pricing engine. At step 264, the lender reviews the commitment and pricing results. At step 266, the lender executes the commitment.

In an exemplary embodiment, the servicer is provided with the ability to monitor the status of committed loans for which it will perform servicing. Thus, after the servicer has been identified and the lender has executed the commitment, the selected servicer-purchaser may be provided with the ability to monitor the status of the commitment, for example, as part of an overall summary of commitments in its pipeline. Thus, at step 272, a pipeline summary report is generated by pipeline reporting logic 179. The pipeline summary reports may be generated responsive to a request from the servicer, as described below in connection with FIGS. 7-18. At step 274, a servicer may access pipeline summary screen displays through the user interface of servicing execution logic 170. Examples of pipeline summary screen displays are discussed in connection with FIGS. 7-18, described in greater detail below.

In an exemplary embodiment, the status of the loan commitment may be dynamically updated during the period before closing, as described in U.S. Ser. No. 11/322,358, entitled "System and Method for Processing a Loan," filed Dec. 30, 2005, hereby incorporated by reference. In such an embodiment, the servicer may be provided with a real time indication of the status of loans in its pipeline. Additionally, the status of workflow conditions for a loan application may be monitored for purposes of performing pipeline risk management for the servicer, in the same manner as described therein in connection with lenders. The likelihood of a loan closing based on the current status of the loan may also be determined and provided to the servicer.

At step 280, the lender closes and delivers the loan. The delivery of a loan file typically refers to the process of transferring the loan documents (electronic or paper) to another party, either by physical delivery or electronically. At step 282, the servicer submits the net SRP funds to funding logic 180. At step 284, loan funding logic 186 disburses the funds to the lender. A payment amount for the net SRP funds may be generated by funding logic 180. The net SRP funds include the gross SRP minus the total fees charged by the servicer and the total escrows. The SRP total fees may further include various charges by the servicer, such as tax certification charges, administrative fees, etc. SRP reimbursement logic 184 communicates a request to the servicer to remit the net SRP funds. At step 286, the lender receives the funding, including the net SRP funding for the servicing asset and the funding for the loan asset. At step 288, the loan is exported for loan servicing. In addition to other loan data, the exported data may include escrow related data for property taxes, hazard insurance, flood insurance, and so on, which may be imported by the seller and exported by the servicer. At step 290, the servicing file is delivered to the servicer, and the loan sale transaction is complete. The servicer prepares the loan file in order to service the new loan.

II. Exemplary User Interface for Servicer Users

Referring now to FIGS. 5-19, an exemplary user interface provided by user interface logic 171 is shown. As indicated above, with execution system 140, lenders that do not service the loans they originate may request SRP pricing, e.g., at the time of commitment. To facilitate the process of presenting a servicing-released execution price to lenders, servicing execution logic 170 provides servicers with a user interface including tools to import SRP schedules (including any adjustments to the schedule and loan-level fees associated with taxes, processing, certifications, and the like) and to view and report on their pipeline of commitments.

Figure 5:
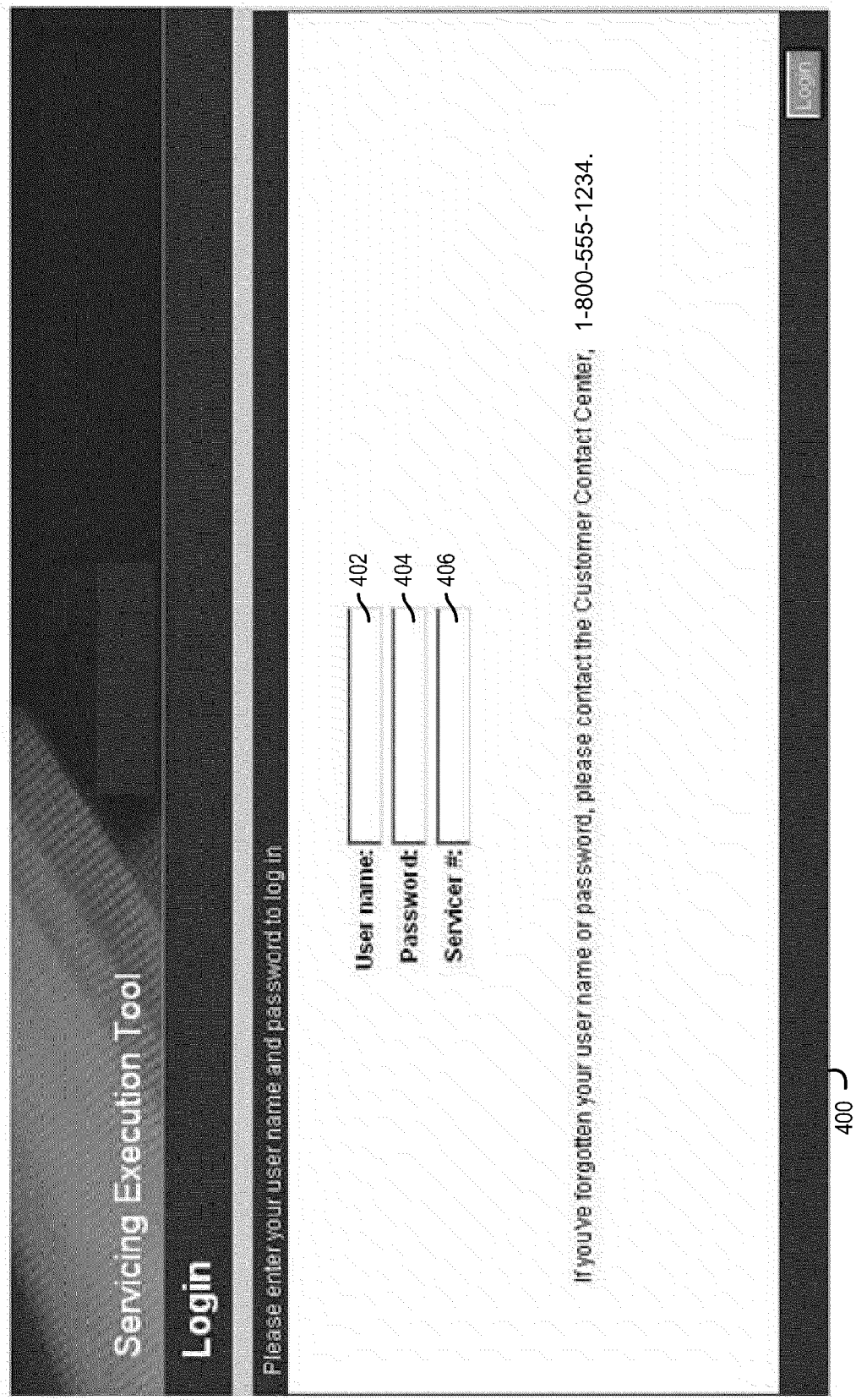
FIG. 5 is a screen display that may be presented to a user at a servicer in connection with logging in to servicing execution logic of FIG. 1 according to an exemplary embodiment.

Referring first to FIG. 5, FIG. 5 is a screen display 400 that may be presented to a user at a servicer in connection with logging into servicing execution logic 170. Screen display 400 includes data fields to identify each user accessing execution system 140 and to authenticate each user's access rights. Screen display 400 includes user name field 402, password field 404, and servicer number field 406. Each system user, within a particular servicer, may be assigned an individual user login name to input into user name field 402. Further, execution system 140 may require an alphanumeric password to be input into password field 404, in order to verify the login authenticity of each user within the servicer. Servicer number field 406 may require each user to identify the servicer with which the particular user is associated by inputting a plurality of alphanumeric characters which identify each particular servicer.

Figure 6:
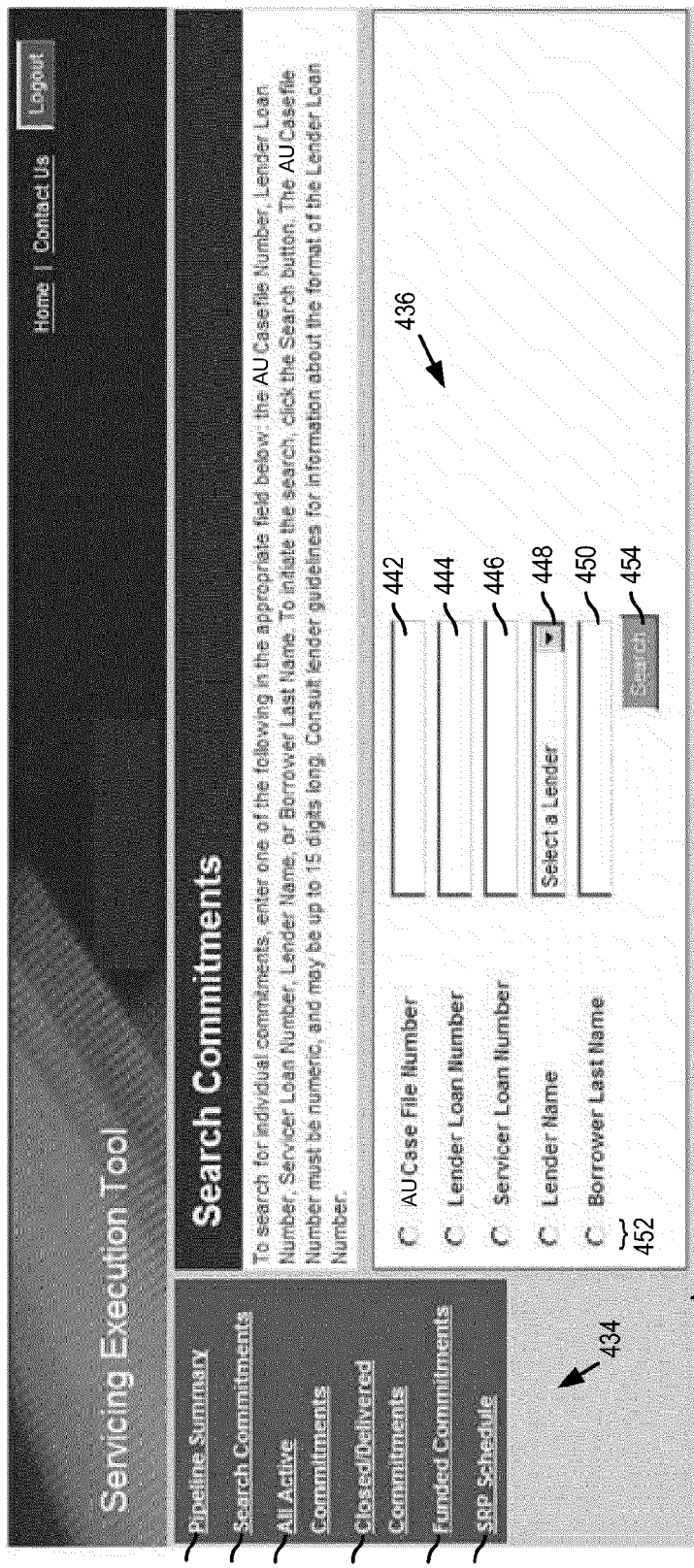
FIG. 6 is a screen display that may be presented to a user at a servicer to permit the user to conduct a search of commitments according to an exemplary embodiment.

Referring now to FIG. 6, FIG. 6 is a screen display 420 that may be presented to a servicer after the user has successfully logged in to servicing execution logic 170. In FIG. 6, a series of links are provided which enable a servicer to view its loan commitments. A pipeline summary link 422 connects the servicer to a pipeline summary screen display 480 (shown in FIG. 8) that lists summary information associated with all commitments in the servicer's pipeline. A search commitments link 424 delivers the servicer to a search query screen display, which allows the servicer to search for any commitment using certain predefined data fields. An all active commitments link 426 delivers the servicer to a summary screen display of all commitments on which the servicer's SRP schedule has been selected by a lender. A closed/delivered commitments link 428 delivers the servicer to a summary screen display of all commitments on which the servicer provided the winning SRP schedule that have been closed or delivered. A funded commitments link 430 delivers the servicer to a summary screen display of all commitments that have been funded. Additionally, an SRP schedule link 432 delivers the servicer to a summary screen display to review SRP schedules, adjustments, and fees associated with each product, lender, and so on. In combination, links 422-432 form a navigation menu 434 for use in navigating through the user interface provided by user interface logic 171. As will be seen below, in an exemplary embodiment, navigation menu 434 is provided throughout various screen displays provided by the user interface logic 171.

In FIG. 6, the user has selected search commitments link 424, and the screen display 420 is a screen display for use in searching commitments. Screen display 420 provides the user with a search menu 436 which includes a plurality of search fields 442-450 that permit the user to search commitments based on different parameters. Field 442 permits the user to search commitments based on a casefile number used by automated underwriting engine 150. The case file number is a unique number assigned to a case file when a loan is underwritten by automated underwriting engine 150. Field 444 permits the user to search commitments based on a lender loan number. Field 446 permits the user to search commitments based on a servicer loan number. Field 448 permits the user to search commitments based on a lender name. Field 450 permits the user to search commitments based on a borrower last name. In order to select one of the fields 442-450, the user may select a button 452 adjacent to the data field 442-450 to be searched and input the appropriate data on which to search. Once the user has entered a search parameter, the user may select button 454 in order to perform a search to locate the commitment file or files meeting the specified parameters.

Figure 7:
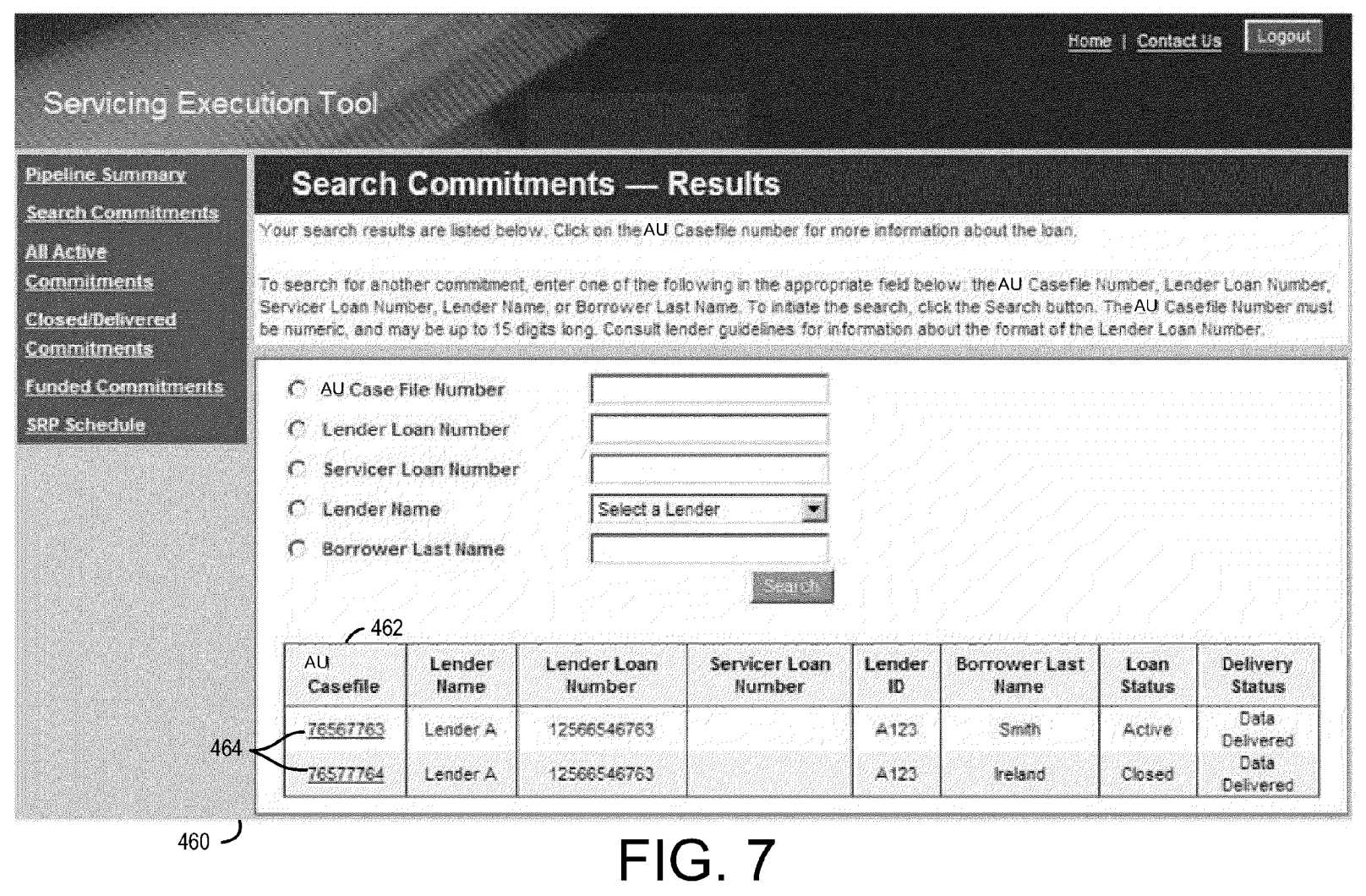

Referring now to FIG. 7, FIG. 7 is a screen display 460 showing search results that may be presented to a user responsive to the user performing a search in FIG. 6. For example, after entering search criteria in FIG. 6, and selecting the search button 454, the user may be delivered to search results screen display 460 of FIG. 7.

In FIG. 7, the user is presented with a table 462 showing commitments that meet the search criteria entered by the user in FIG. 6. The user may view additional information regarding a specific commitment by selecting its case file number 464. Upon selecting the case file number 464 (provided as a selectable link), the user may be presented with a screen display 680 showing commitment details for the selected commitment, as described in greater detail below in connection with FIG. 18.

Figure 8:
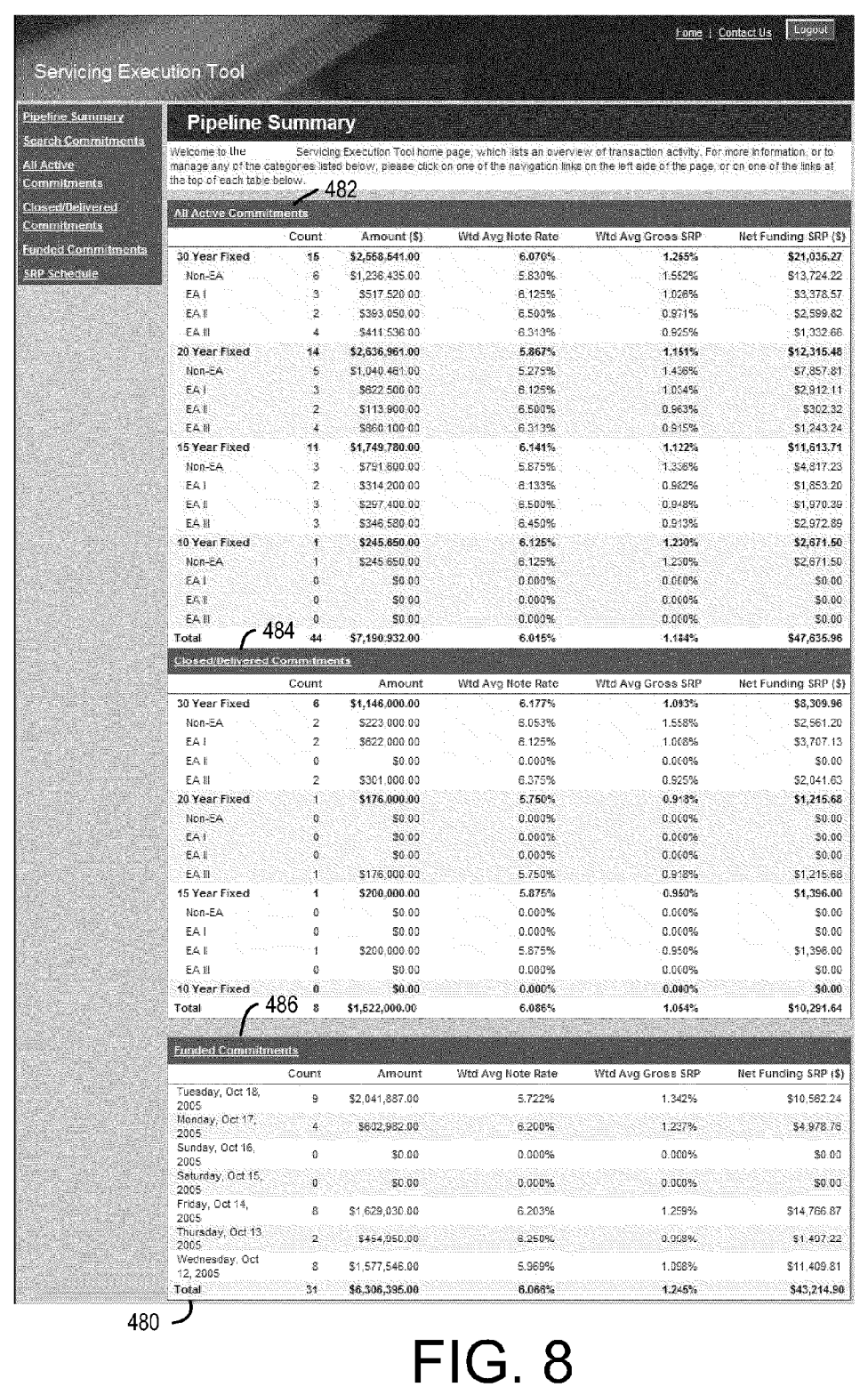

Referring now to FIG. 8, FIG. 8 is a screen display 480 showing a pipeline summary for the servicer. For example, the user may be presented with screen display 480 after selecting the pipeline summary link 422.

Screen display 480 lists summary information associated with each commitment in a pipeline of the servicer. The screen display contains a number of section headings including an "All Active Commitments" section heading 482, and a "Closed/Delivered Commitments" section heading 484, and a "Funded Commitments" section heading 486. The section headings 482-486 may each be provided as selectable links that the user may select to be provided with screen displays that display more detailed information about the commitments in the specified category. Although fixed interest rate loans are shown in FIG. 8, it will be appreciated that the commitments may include adjustable interest rate loans in addition to or instead of the fixed interest rate loans.

Figure 9:
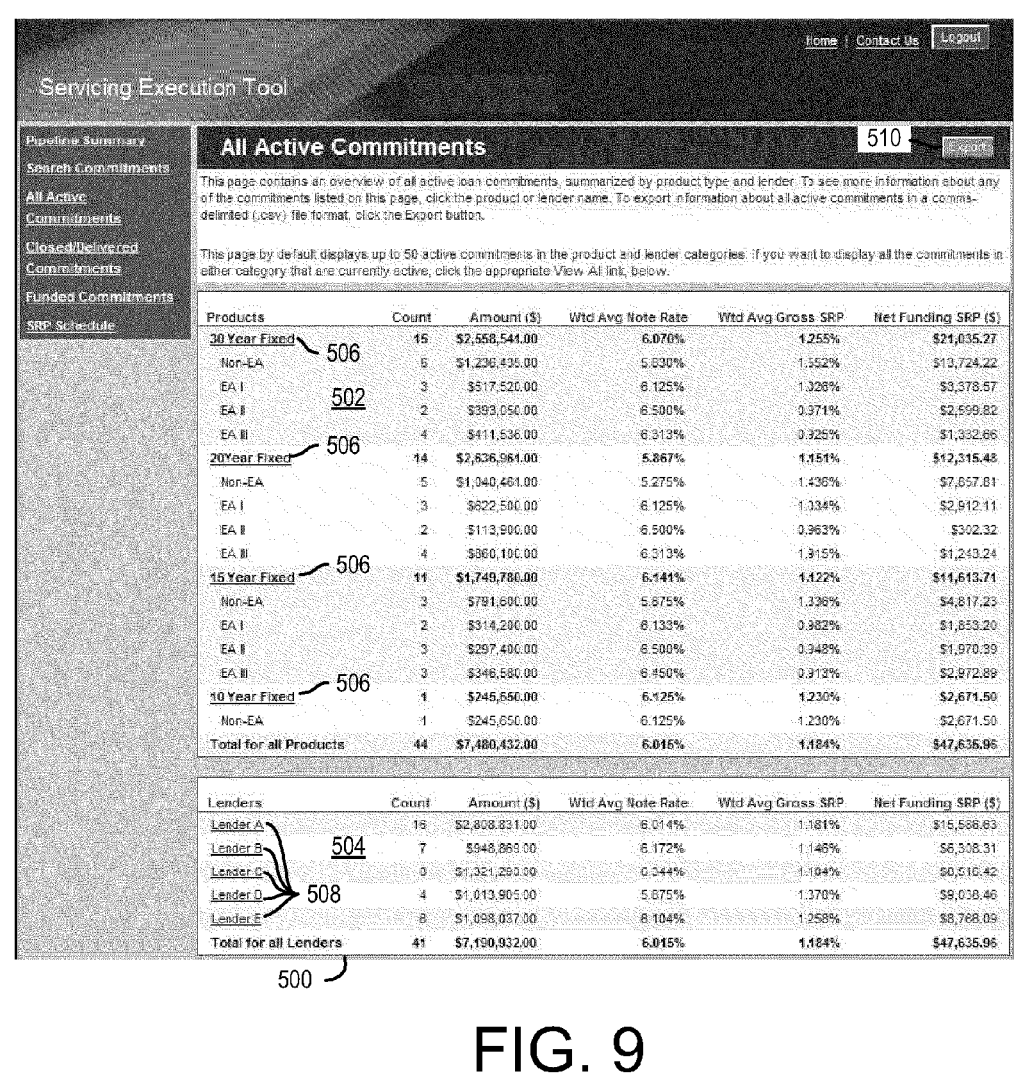

Referring now to FIG. 9, FIG. 9 is a screen display 500 showing active commitments for the servicer. For example, the user may be presented with screen display 500 after selecting the "All Active Commitments" link 426 in navigation menu 434, or upon selecting the "All Active Commitments" section heading 482 in FIG. 8. The "active" status indicates that the loan has been committed via committing logic 160 but has not yet closed.

Screen display 500 provides an overview of all active commitments, summarized by product type in window 502 and by lender in window 504. Each window 502, 504 summarizes the cumulative loan amount, weighted average note rate, weighted average gross SRP, and net funding SRP for each product type or lender, respectively. Each product type and lender may be presented as a selectable link 506 and 508, respectively. Additional commitment and servicing information may be viewed for individual case files by clicking on the link 506, 508 associated with a product type or lender of interest. A button 510 may be selected by the user to export the list of active commitments to another system (e.g., as a comma separated value file, as a spreadsheet file, and/or in another format).

Figure 10:
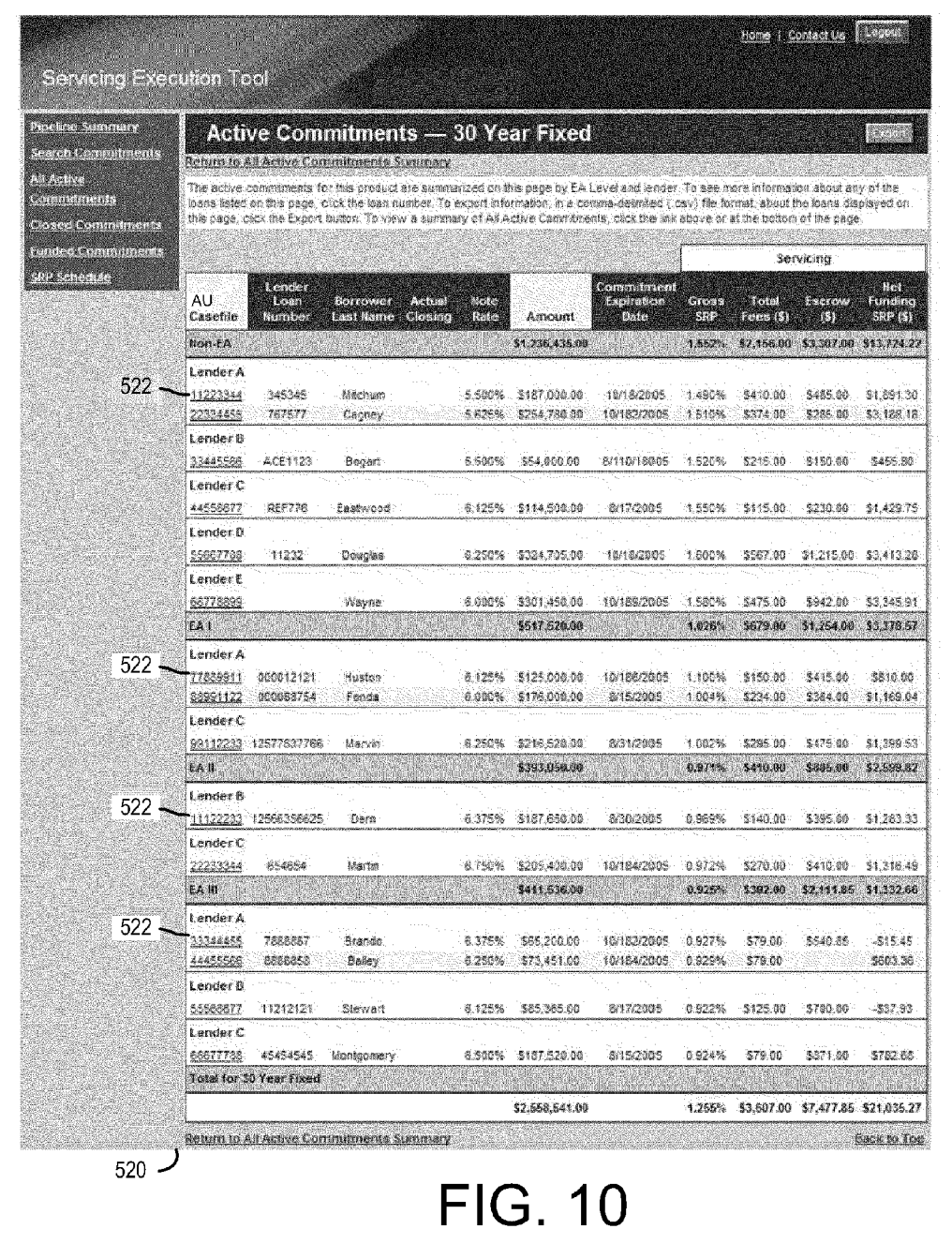

Referring now to FIG. 10, FIG. 10 is a screen display 520 showing active commitments by product type (e.g., 30 year fixed). For example, the user may be presented with screen display 520 after selecting a corresponding product-type link 506 in FIG. 9.

In FIG. 10, active commitments for a specific product are summarized by expanded approval (EA) level and lender. The user may be provided the option of viewing the details of a particular commitment by selecting an automated underwriting engine (AU) casefile link 522. Upon selecting a link 522, commitment detail screen display 680 may be displayed, as shown in FIG. 18.

Figure 11:
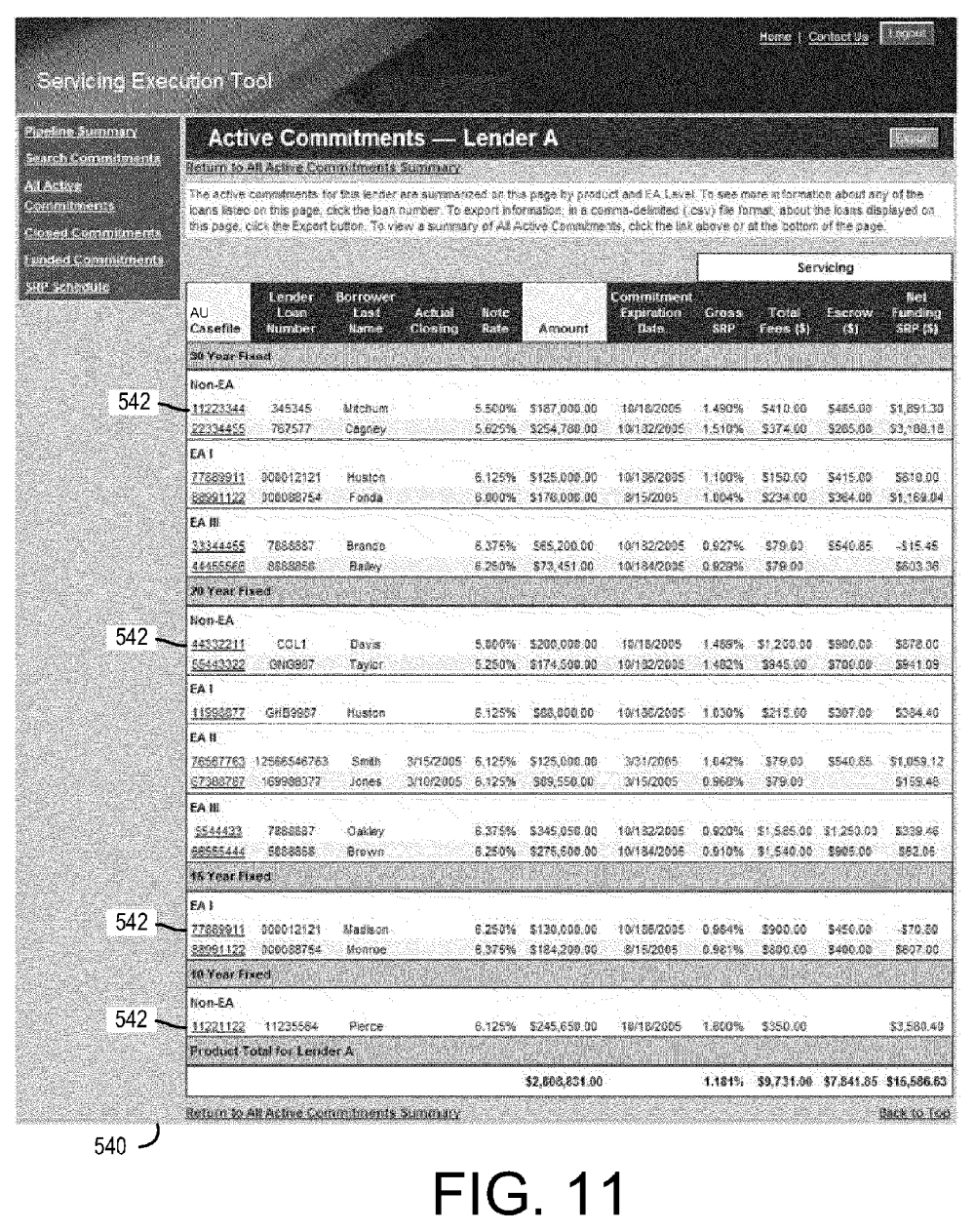

Referring now to FIG. 11, FIG. 11 is a screen display 540 showing active commitments for a specific lender. For example, the user may be presented with screen display 540 after selecting a corresponding lender name link 508 in FIG. 9.

In FIG. 11, active commitments for a specific product are summarized by product type and expanded approval level. The user may be provided with the option of viewing the details of a particular commitment by selecting an automated underwriting engine (AU) casefile link 542. Upon selecting a link 542, commitment detail screen display 680 may be displayed, as shown in FIG. 18.

Figure 12:
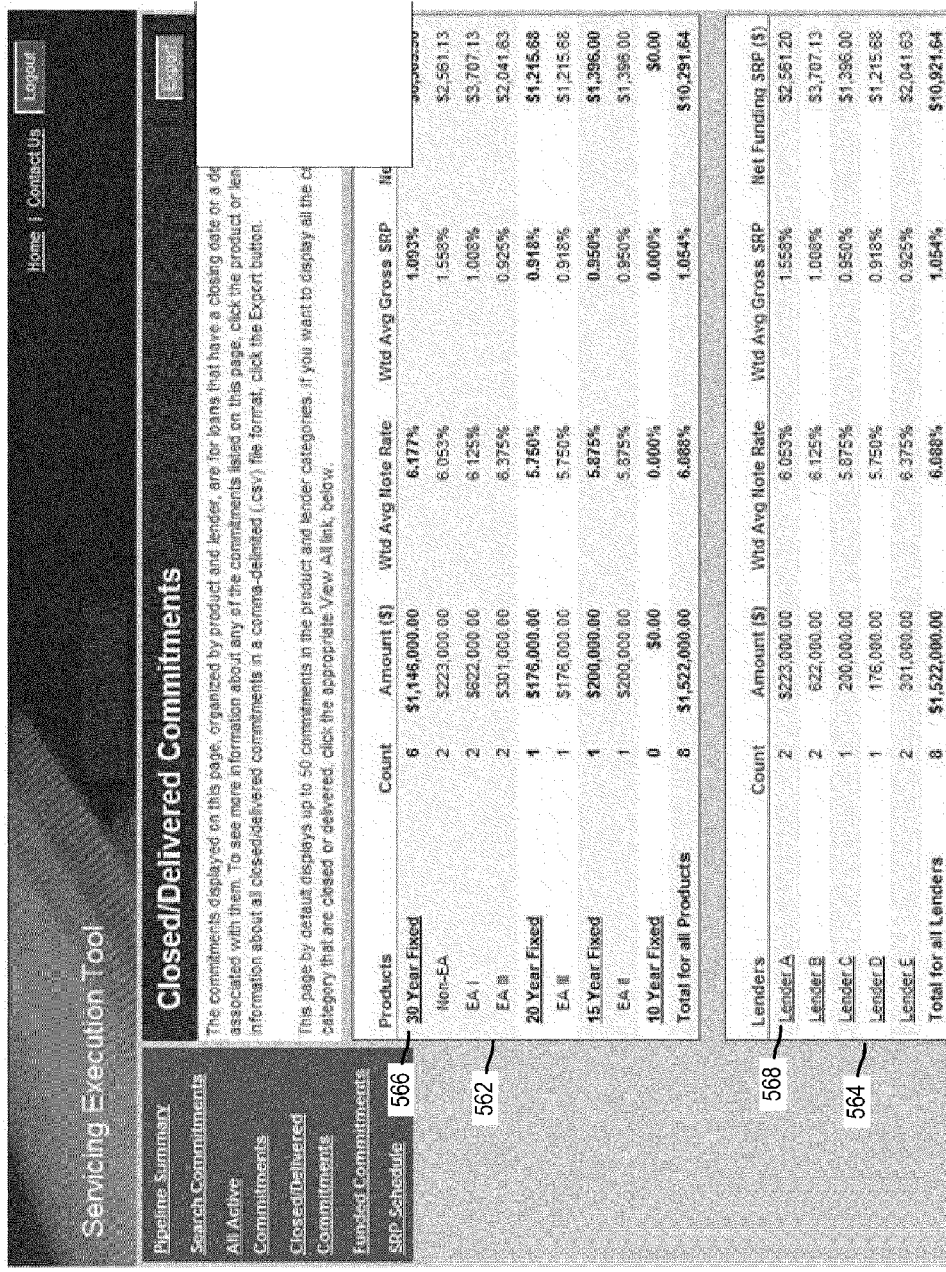
FIG. 12 is a screen display showing closed/delivered commitments for the servicer according to an exemplary embodiment.

Referring now to FIG. 12, FIG. 12 is a screen display 560 showing closed/delivered commitments for the servicer. For example, the user may be presented with screen display 560 upon selecting the "Closed/Delivered Commitments" link 428 in navigation menu 434, or upon selecting the "Closed/Delivered Commitments" section heading 482 in FIG. 8. The "closed/delivered" status indicates that the loan has closed and delivered, but has not yet been funded.

In FIG. 12, an overview of all closed and delivered commitments is summarized by product type in window 562 and lender in window 564. Each window 562, 564 summarizes the cumulative loan amount, weighted average note rate, weighted average gross SRP, and net funding SRP. Additional commitment and servicing information may be provided by clicking on a link 566 for a particular product type or by clicking on a link 568 for a particular lender.

Referring now to FIG. 13, FIG. 13 is a screen display 580 showing closed and delivered commitments by product type (e.g., 30 year fixed). For example, the user may be presented with screen display 580 after selecting a product-type link 566 in FIG. 12.

In FIG. 13, closed and delivered commitments for a specific product are summarized by expanded approval (EA) level and lender. The user may be provided the option of viewing the details of a particular commitment by selecting an automated underwriting engine (AU) casefile link 582. Upon selecting a link 582, commitment detail screen display 680 may be displayed, as shown in FIG. 18.

Referring now to FIG. 14, FIG. 14 is a screen display 600 showing closed and delivered commitments for a specific lender. For example, the user may be presented with screen display 600 after selecting a lender name link 564 in FIG. 12.

In FIG. 14, closed and delivered commitments for a specific product are summarized by product type and expanded approval level. The user may be provided with the option of viewing the details of a particular commitment by selecting an automated underwriting engine (AU) casefile link 602. Upon selecting a link 602, commitment detail screen display 680 may be displayed, as shown in FIG. 18.

Referring now to FIG. 15, FIG. 15 is a screen display 620 showing funded commitments for the servicer. For example, the user may be presented with screen display 620 after selecting the "Funded Commitments" link 430 in navigation menu 434, or upon selecting the "Funded Commitments" section heading 486 in FIG. 8. The "funded" status indicates that the loan is closed and delivered and funds have been transmitted.

Screen display 620 provides an overview of all funded commitments, summarized by date in window 622 and by lender in window 624. Each window 622, 624 summarizes the cumulative loan amount, weighted average note rate, weighted average gross SRP, and net funding SRP for each date or lender, respectively. Each date and lender may be presented as a selectable link 626 and 628, respectively. Additional commitment and servicing information may be viewed for individual case files by clicking on the link 626, 628 associated with a date or lender of interest.

Figure 16:
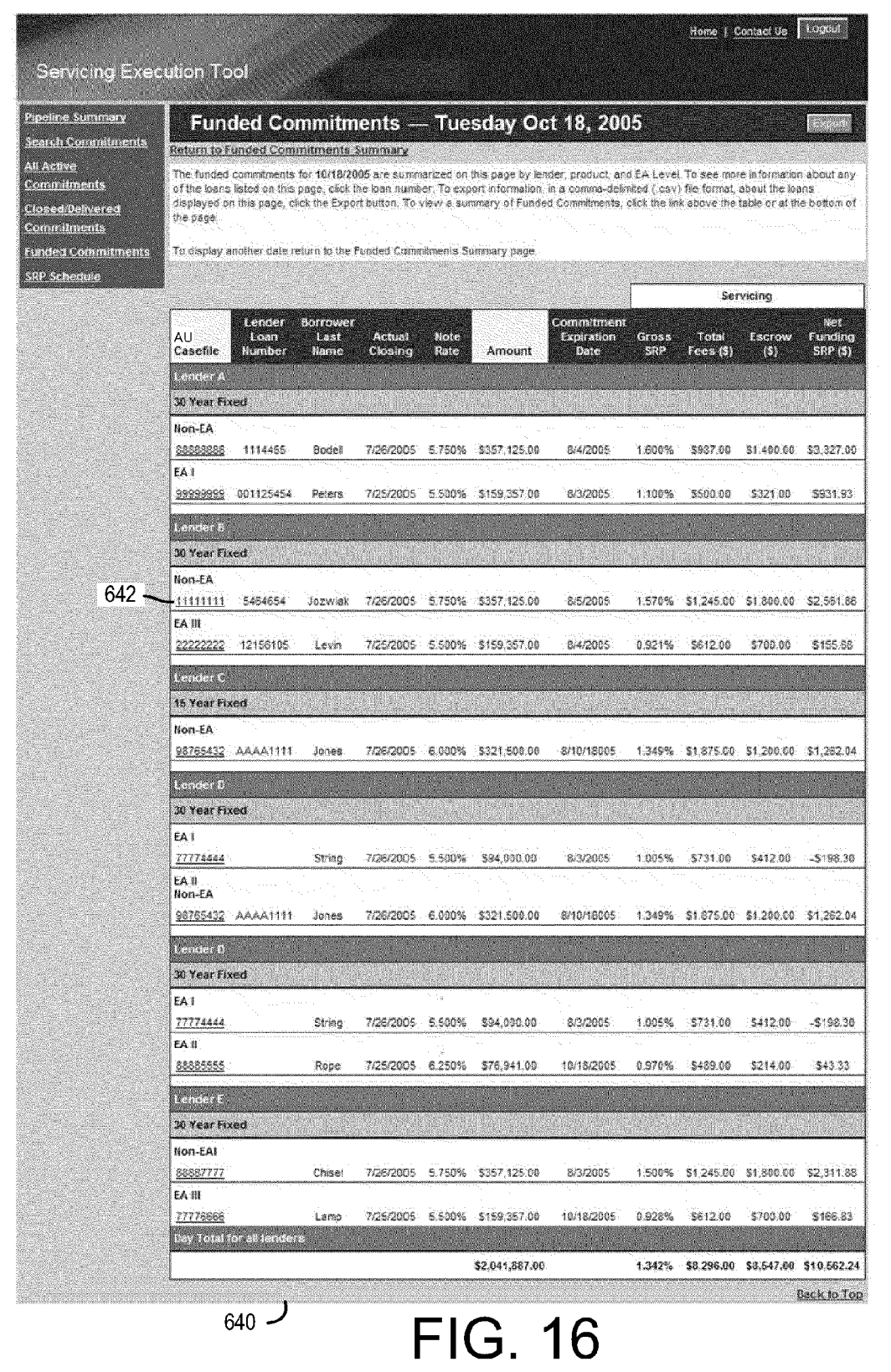

Referring now to FIG. 16, FIG. 16 is a screen display 640 showing funded commitments for the servicer for a specific date. For example, the user may be presented with screen display 640 after selecting the one of the date links 626 in FIG. 15.

Screen display 640 provides an overview of all funded commitments displayed for a specific date, summarized by lender, product type, and EA level. The user may view additional details of a particular commitment by clicking on the AU casefile link 642. Upon selecting a link 642, commitment detail screen display 680 may be displayed, as shown in FIG. 18.

Figure 17:
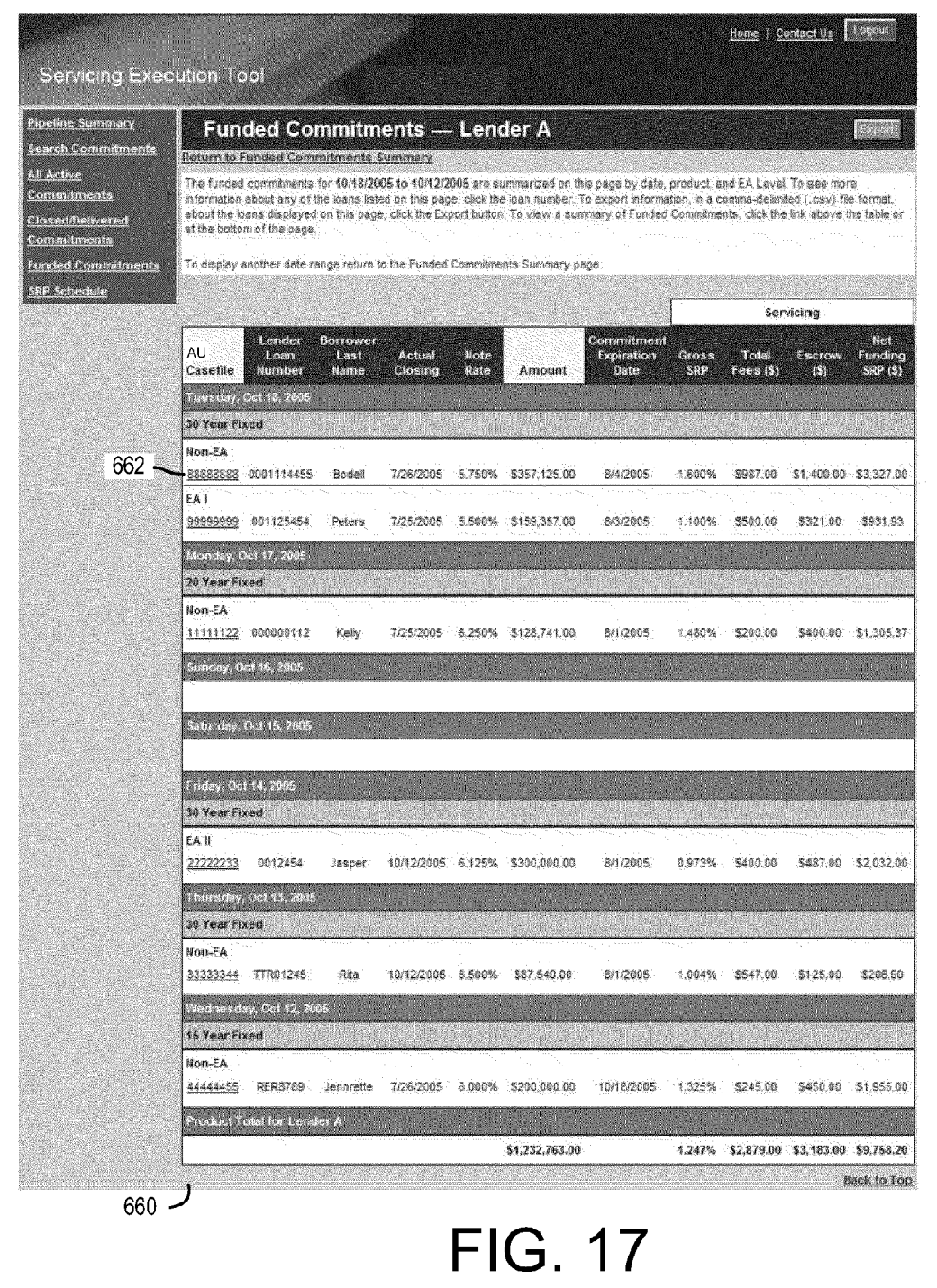

Referring now to FIG. 17, FIG. 17 is a screen display 660 showing funded commitments for the servicer for a specific lender. For example, the user may be presented with screen display 660 after selecting the one of the lender name links 628 in FIG. 15.

Screen display 660 provides an overview of all funded commitments displayed for a specific lender, summarized by date, product type, and EA level. The user may view additional details of a particular commitment by clicking on the AU casefile link 662. Upon selecting a link 662, commitment detail screen display 680 may be displayed, as shown in FIG. 18.

Referring now to FIG. 18, FIG. 18 is a screen display 680 that may be presented to provide commitment and servicing details for a particular commitment. For example, screen display 680 may be displayed as a pop-up window when an AU case file link is selected on a screen display listing loan commitments, as described above.

Screen display 680 provides information on an individual commitment in the servicer's pipeline. Commitment status, closing and commitment dates, and SRP data may be displayed for review. Additionally, as shown in window 682, screen display 680 may show information concerning the net SRP funding to be provided by the servicer to the lender. As apparent from window 682, funds exchanged between the lender and servicer (e.g., escrows) may be reconciled immediately, such that the servicer pays the only the SRP net funding.

Figure 19:
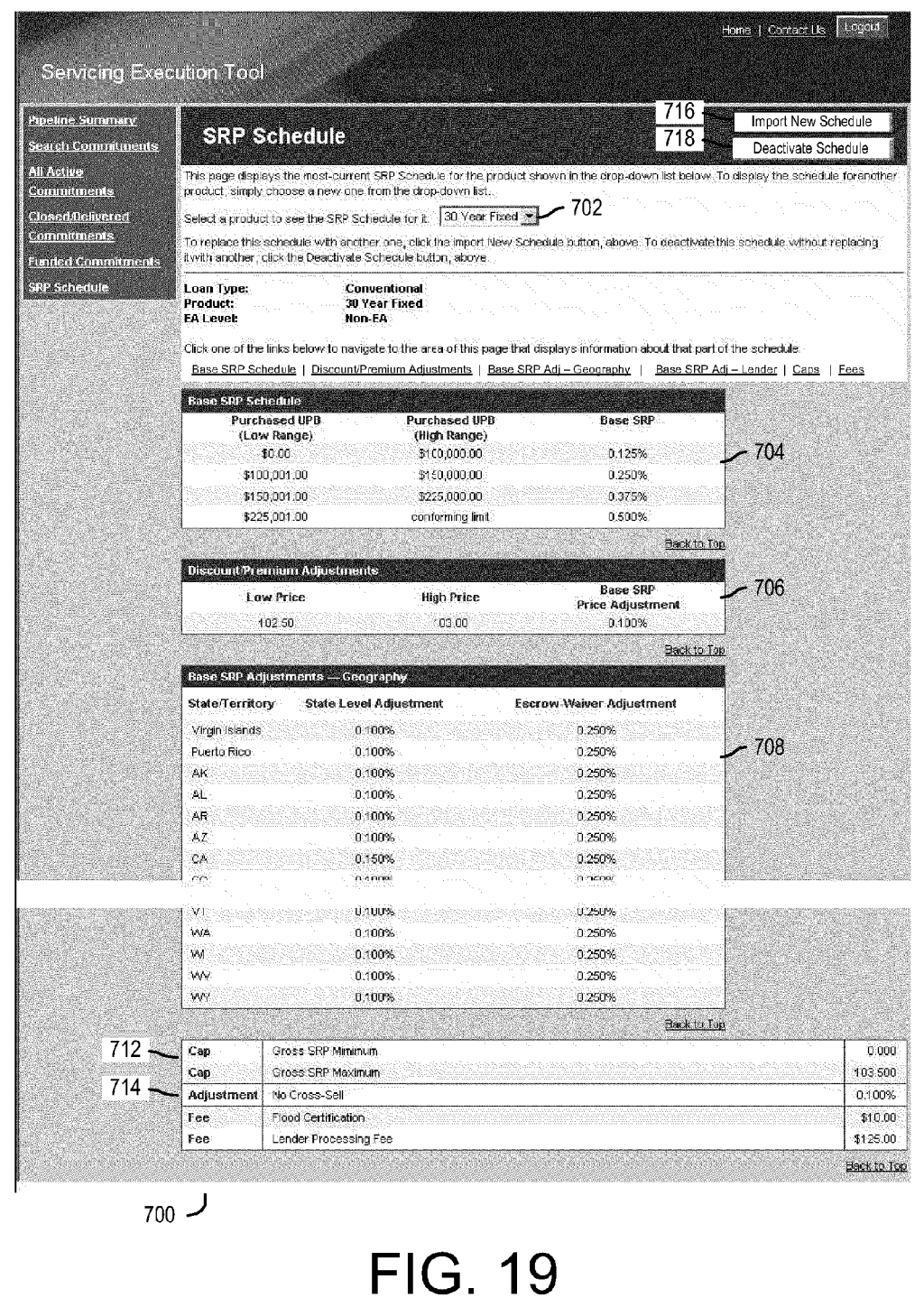

Referring now to FIG. 19, FIG. 19 is a screen display 700 that may be presented to a user to provide detailed information on the SRP schedules associated with specific commitment products. For example, screen display 700 may be presented responsive to the user selecting the SRP schedule link 432 in navigation menu 434.

The SRP schedules indicate the price the servicer is willing to pay in connection with a particular type of loan. As indicated above, in an exemplary embodiment, the SRP schedules provided by different servicers may be compared and the servicer with the pricing schedule that offers the lender the most favorable pricing in the context of a particular transaction may be selected. After a servicer has been selected, the SRP schedule relevant to the transaction is also used to generate the servicing component of the all-in price that is paid to the lender for the loan and servicing assets. In the example of FIG. 19, the SRP schedule is not lender-specific, that is, the same schedule is used for providing pricing to all lenders. Additionally, a single SRP schedule includes pricing for multiple different products, rather than different SRP schedules for different products. As indicated above, however, lender-specific SRP schedules and/or different SRP schedules for different products may also be used.

Each SRP Schedule is product-specific and comprises a base SRP schedule, a discount/premium schedule, base SRP adjustments for any escrow waivers (defined by state or territory), and any associated fees that a servicer may charge. The user may view the SRP schedule for a specific loan product by selecting the product from the SRP schedule product drop-down list 702. The SRP schedule page 700 may automatically update to display the schedule for the selected product.

As shown in window 704, the SRP depends on the type of loan and the unpaid principal balance (UPB) of the loan being serviced. The base SRP schedule in window 704 lists the base SRP associated with a contiguous range of UPB for the selected product. The base SRP may be a negative value, indicating a discount to the seller, or a positive value, indicating a premium to the seller.

As shown in window 706, adjustments to the base SRP can be made for a range of loan prices above and below par. For example, in window 706, a loan price in the range of 102.50 to 103.00 may have a premium of 0.100%.

As shown in window 708, adjustments to the base SRP can be made based on geography. Window 708 displays a list of states and territories that loans can be originated in, along with any SRP adjustments associated with that state or territory (displayed as the state-level adjustment, above), as well as an adjustment to the escrow amount allowed for that state.

As shown in window 712, the servicer's SRP schedule sets the gross minimum and gross maximum SRP amounts, relative to par, that can be paid for servicing rights for any given loan of the selected product type. As shown in window 714, an additional adjustment may be made where the lender has specified that no cross selling is to be permitted in connection with the transferred servicing rights. For example, when committing to sell the loan, the lender may be provided an option in which the lender specifies that the servicer shall not be permitted to attempt to cross sell other services offered by the servicer to the borrower. In such an instance, the adjustment shown in window 714 permits the servicer to adjust its pricing based on the fact that cross-selling is not permitted. Additional adjustments may be made for other origination costs such as fees for flood certification, lender processing, and the like.

In another exemplary embodiment, servicers may be provided with the ability to add custom-defined adjustments. For example, if it is assumed that the "no cross-sell" adjustment described above in connection with window 714 was configured by the various fields shown in window 714 may be defined by the servicer. Thus, the servicer may define an adjust description (e.g., "cross-sell"), and adjustment field value (e.g., "yes" or "no"), and an adjustment amount to be charged based on the adjustment field value (e.g., 0.100%). Where a servicer has defined such an adjustment, lenders may subsequently (when committing to sell the loan) specify the adjustment field value (e.g., "yes" or "no") for the loan that is being committed, and the pricing offered to the lender may reflect the specified adjustment field value.

Screen display 700 also includes buttons 716, 718 that permit a servicer to import new SRP schedules or deactivate existing SRP schedules, respectively. Again, transaction execution system 140 may be configured such that a single or multiple SRP schedules are used by each servicer, e.g., depending on the level of configurability by lender or by product is provided for the servicer, depending on preferred user interface implementations, and so on. A new SRP schedule may be imported by selecting button 716 and importing a file containing a new SRP schedule. The SRP import file may contain SRP schedules for various loan products or a single SRP schedule for a specific loan product. The servicer may to import additional SRP schedules for various loan products, as necessary, until the process of importing SRP schedules is terminated by the servicer. Additionally, a servicer may use button 718 to deactivate an SRP schedule. For example, an SRP schedule may be deactivated when a new SRP schedule is imported or when the previous SRP schedule needs to be updated. As another example, an SRP schedule may be deactivated when a servicer wishes to temporarily discontinue purchasing servicing rights, e.g., to limit its volume of new business. Once a schedule is deactivated, it is retained in database 172 for future reference when performing processing in connection with any commitments that were previously entered into pursuant to that schedule.

In another exemplary embodiment, additional profile screens may be provided to permit services to configure aspects of business relationships with individual lenders. For example, if a single SRP schedule is used, such profile screens may be used to lender-specific adjustments to the pricing set forth in the SRP schedules. Such price adjustments may be specified globally for all products sold by the lender, may be specified on a product-by-product basis, or in another manner. Likewise, other aspects of business relationships (e.g., subservicing, lender-paid mortgage insurance, and so on) may be configured through such profile screens.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention as defined in the appended claims. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention as expressed in the appended claims.

What is claimed is:

1. A method for facilitating the sale of a loan, the loan having a loan asset and a service asset, the method comprising the steps of:
    receiving, by a computing system, a bid from one or more servicers for purchasing the servicing asset;
    receiving, by the computing system, a loan commitment selection from a lender;
    selecting, by the computing system, a servicer from the one or more servicers to match with a lender based upon a predefined set of criteria for selecting a servicer;
    generating, by the computing system, an all-in price, the all-in price including the price for purchasing the loan asset and the servicing asset; and
    disbursing, by the computing system, funds for purchasing the servicing asset from the selected servicer to the lender, the funds comprising a gross price associated with the selected servicer's bid less fees charged by the selected servicer, wherein the funds are disbursed after the servicer has been selected and after closing of the loan such that the selected servicer and not the lender supports and manages the servicing asset after closing of the loan, wherein closing of the loan occurs when a borrower signs a financial note associated with the loan and receives a deed to property associated with the loan.

2. A method according to claim 1, further including collecting funds from the servicer, the funds being representative of the all-in price.

3. A method according to claim 2, wherein the servicer accesses the servicing logic for importing and exporting data.

4. A method according to claim 2, wherein the servicer accesses the servicing logic for managing the servicer's loan commitments.

5. A method according to claim 1, wherein a lender or a servicer are provided access to a user interface to access loan commitment data over a global communication network.

6. A method according to claim 1, wherein the loan commitment from the lender is a servicing-released commitment.

7. A method according to claim 6, wherein the loan commitment selection is a best efforts commitment.

8. A method according to claim 6, wherein the loan commitment selection is a mandatory commitment.

9. A system for interfacing one or more lenders with one or more servicers to facilitate the sale of a loan from a lender to a servicer, the loan having a loan asset and a servicing asset, the system comprising:
    committing logic configured to receive a loan commitment selection from the lender, wherein the committing logic comprises instructions that are stored on at least one computer-readable medium and are executable by at least one processor; and
    servicing execution logic configured to receive a bid to purchase the servicing asset of the loan submitted by one or more servicers, wherein the servicing execution logic is configured to match one of the one or more servicers to a lender based upon a predefined set of criteria for matching a servicer to a lender, wherein the servicing execution logic comprises instructions that are stored on the at least one computer-readable medium and are executable by the at least one processor;
    funding logic configured to calculate funds to be remitted from the servicer to the lender for purchasing the servicing asset of the loan, wherein the funds comprise a gross price associated with the selected servicer's bid less fees charged by the selected servicer, wherein the funding logic is configured to disburse the funds from the selected servicer to the lender after the servicer has been matched with the lender and after closing of the loan such that the selected servicer and not the lender supports and manages the servicing asset after closing of the loan, wherein closing of the loan occurs when a borrower signs a financial note associated with the loan and receives a deed to property associated with the loan, and wherein the funding logic comprises instructions that are stored on the at least one computer-readable medium and are executable by the at least one processor.

10. A system according to claim 9, wherein the funding logic is configured to collect a servicing-released premium from the servicer for the servicing asset of the loan.

* * * * *